United States Patent
Hebert et al.

(10) Patent No.: US 10,235,207 B2
(45) Date of Patent: Mar. 19, 2019

(54) METHOD AND SYSTEM FOR PREEMPTIBLE COPROCESSING

(71) Applicant: Nimbix, Inc., Anna, TX (US)

(72) Inventors: Stephen M. Hebert, Houston, TX (US); Leonardo E. Reiter, Allen, TX (US)

(73) Assignee: Nimbix, Inc., Anna, TX (US)

( * ) Notice: Subject to any disclaimer, the term of this patent is extended or adjusted under 35 U.S.C. 154(b) by 21 days.

(21) Appl. No.: 15/281,155

(22) Filed: Sep. 30, 2016

(65) Prior Publication Data

US 2018/0095795 A1 Apr. 5, 2018

(51) Int. Cl.
*G06F 11/00* (2006.01)
*G06F 9/50* (2006.01)
*G06F 9/48* (2006.01)
*G06F 11/14* (2006.01)

(52) U.S. Cl.
CPC .......... *G06F 9/5011* (2013.01); *G06F 9/4812* (2013.01); *G06F 9/4881* (2013.01); *G06F 11/1438* (2013.01); *G06F 2201/805* (2013.01)

(58) Field of Classification Search
CPC ....................................................... G06F 11/34
See application file for complete search history.

(56) References Cited

U.S. PATENT DOCUMENTS

| | | | | |
|---|---|---|---|---|
| 5,465,354 A | * | 11/1995 | Hirosawa | G06F 11/3419 714/E11.195 |
| 5,579,527 A | * | 11/1996 | Chin | G06F 9/30036 708/523 |
| 5,781,775 A | * | 7/1998 | Ueno | G06F 8/451 712/21 |
| 5,946,463 A | | 8/1999 | Carr et al. | |
| 5,978,830 A | * | 11/1999 | Nakaya | G06F 8/456 718/102 |
| 6,711,606 B1 | | 3/2004 | Leymann et al. | |
| 7,299,466 B2 | | 11/2007 | Pulsipher | |
| 7,712,100 B2 | | 5/2010 | Fellenstein et al. | |
| 7,827,273 B2 | | 11/2010 | Wilson et al. | |

(Continued)

FOREIGN PATENT DOCUMENTS

| | | |
|---|---|---|
| EP | 2 381 363 A2 | 10/2011 |
| EP | 2 381 363 A3 | 3/2012 |

(Continued)

OTHER PUBLICATIONS

Goscinski A. et al., "Toward Dynamic and Attribute Based Publication, Discovery and Selection for Cloud Computing," Future Generations Computer Systems, Elsevier Publishers, Amsterdam, NL, vol. 26, No. 7, Jul. 1, 2010, pp. 947-970.

(Continued)

*Primary Examiner* — Christopher S McCarthy
(74) *Attorney, Agent, or Firm* — Campbell Stephenson LLP

(57) ABSTRACT

Methods, computer program products, and systems supporting preemptible coprocessing are disclosed. The method includes executing at least a portion of a first compute job, and executing at least a portion of a second compute job. The method further includes, prior to completing execution of the at least the portion of the second compute job, interrupting the execution of the second compute job, and scheduling at least a portion of a third compute job.

18 Claims, 16 Drawing Sheets

(56) References Cited

U.S. PATENT DOCUMENTS

| | | | |
|---|---|---|---|
| 8,131,804 B2 | 3/2012 | Greata | 709/206 |
| 8,775,576 B2 | 7/2014 | Hebert et al. | |
| 9,094,404 B2 | 7/2015 | Hebert et al. | |
| 9,367,395 B1 | 6/2016 | Bono | |
| 9,411,528 B1 | 8/2016 | McGarry et al. | |
| 9,411,613 B1 | 8/2016 | McGarry et al. | |
| 9,417,894 B1 | 8/2016 | Giganti et al. | |
| 9,606,833 B2* | 3/2017 | Vrind | G06F 9/4887 |
| 2003/0042930 A1 | 3/2003 | Pileggi | |
| 2003/0154112 A1* | 8/2003 | Neiman | G06F 9/5044 |
| | | | 705/5 |
| 2004/0210641 A1 | 10/2004 | Wu | 709/211 |
| 2006/0036743 A1 | 2/2006 | Deng | |
| 2006/0055956 A1* | 3/2006 | Takahashi | G06F 3/1211 |
| | | | 358/1.13 |
| 2006/0206894 A1* | 9/2006 | Jung | G06F 9/4887 |
| | | | 718/100 |
| 2007/0083407 A1 | 4/2007 | Allen | 705/70 |
| 2007/0250365 A1 | 10/2007 | Chakrabarti et al. | |
| 2008/0066070 A1* | 3/2008 | Markov | G06F 9/4818 |
| | | | 718/103 |
| 2008/0133741 A1* | 6/2008 | Kubota | G06F 9/5055 |
| | | | 709/224 |
| 2008/0301685 A1* | 12/2008 | Thomas | G06Q 10/06 |
| | | | 718/102 |
| 2009/0119746 A1 | 5/2009 | Allen | 726/1 |
| 2009/0281977 A1 | 11/2009 | Allen | 706/47 |
| 2009/0300635 A1 | 12/2009 | Ferris | |
| 2009/0319958 A1 | 12/2009 | Li et al. | |
| 2010/0042720 A1 | 2/2010 | Stienhans et al. | |
| 2010/0050172 A1 | 2/2010 | Ferris | |
| 2010/0268755 A1 | 10/2010 | Arimilli et al. | |
| 2010/0287553 A1* | 11/2010 | Schmidt | G06F 9/485 |
| | | | 718/101 |
| 2011/0106951 A1 | 5/2011 | Akiyama et al. | |
| 2011/0153727 A1 | 6/2011 | Li | |
| 2011/0231644 A1 | 9/2011 | Ishebabi | 713/100 |
| 2011/0276977 A1 | 11/2011 | Van Velzen et al. | |
| 2012/0005724 A1 | 1/2012 | Lee | |
| 2012/0023221 A1 | 1/2012 | Dayan | |
| 2012/0042000 A1 | 2/2012 | Heins et al. | |
| 2012/0042210 A1 | 2/2012 | Glaser et al. | |
| 2012/0047239 A1 | 2/2012 | Donahue et al. | |
| 2012/0054626 A1 | 3/2012 | Odenheimer | |
| 2012/0072597 A1 | 3/2012 | Teather et al. | |
| 2012/0131579 A1 | 5/2012 | Pujolle | 718/1 |
| 2012/0182981 A1 | 7/2012 | Kim | 370/338 |
| 2012/0198229 A1 | 8/2012 | Felke | 713/2 |
| 2012/0226843 A1* | 9/2012 | Lin | G06F 9/4812 |
| | | | 710/264 |
| 2012/0317579 A1 | 12/2012 | Liu | |
| 2013/0097651 A1 | 4/2013 | Rendahl | 726/1 |
| 2013/0205114 A1 | 8/2013 | Badam | 711/207 |
| 2013/0219022 A1 | 8/2013 | Manivel | 709/219 |
| 2013/0318240 A1 | 11/2013 | Hebert | 709/226 |
| 2014/0040883 A1 | 2/2014 | Tompkins | 718/10 |
| 2014/0074932 A1 | 3/2014 | Mihara | 709/204 |
| 2014/0181395 A1 | 6/2014 | Vincent | 711/111 |
| 2015/0081764 A1 | 3/2015 | Zhao | 709/203 |
| 2015/0096011 A1 | 4/2015 | Watt | 726/15 |
| 2015/0213011 A1 | 7/2015 | George | 707/802 |
| 2015/0261216 A1* | 9/2015 | Yasuma | G05B 19/41865 |
| | | | 700/100 |
| 2015/0261517 A1 | 9/2015 | Hodge | 717/176 |
| 2015/0269383 A1 | 9/2015 | Lang et al. | |
| 2015/0293793 A1* | 10/2015 | Vrind | G06F 9/4887 |
| | | | 718/103 |
| 2016/0188877 A1 | 6/2016 | Simha | 726/22 |
| 2016/0299795 A1* | 10/2016 | Kagami | G06F 9/4856 |
| 2016/0314025 A1 | 10/2016 | McGarry et al. | |
| 2016/0335124 A1* | 11/2016 | Baker | G06F 9/5038 |

FOREIGN PATENT DOCUMENTS

| | | | |
|---|---|---|---|
| EP | 3007061 A1 | 4/2016 | G06F 9/445 |
| WO | WO 2013/097902 | 7/2013 | |

OTHER PUBLICATIONS

Lazouski, A., et al., "Usage Control in Cloud Systems," Internet Technology and Secured Transactions, 2012 International Conference for Internet Technology and Secured Transactions, IEEE, Dec. 10, 2012, pp. 202-207.

Hsiliev's Blog, "Running Existing Applications on SAP HANA Cloud," retrieved from the Internet: URL:http://hsiliev.blogspot.nl/2013/06/running-existing-applications-on-sap.html (retrieved Apr. 16, 2015); Jun. 30, 2013, pp. 1-8.

Baxter, Rob. et al., "Maxwell—a 64 FPGA Supercomputer", Second NASA/ESA Conference on Adaptive Hardware and Systems (AHS), 2007, IEEE, 8 pages.

Chung, Eric S. et al., "CoRAM: An In-Fabric Memory Architecture for FPGA-based Computing", Carnegie Mellon University, 2011, 10 pages.

Convey Computer Corporation, "The Convey HC-2 TM Computer—Architectural Overview," Convey White Paper, 2011-2012, 10 pages.

George, Alan et al., "Novo-G: At the Forefront of Scalable Reconfigurable Supercomputing", Jan./Feb. 2011 issue of IEEE Magazine—Computing in Science and Engineering, 4 pages.

Putnam, Andrew et al., "A Reconfigurable Fabric for Accelerating Large-Scale Datacenter Services", Catapult ISCA 2014, Microsoft, IEEE 2014, 12 pgs.

Sato, Yukinori et al., "Evaluating Reconfigurable Dataflow Computing Using the Himeno Benchmark", IEEE 2012, 7 pages.

So, Hayden Kwok-Hay et al., "A Unified Hardware/Software Runtime Environment for FPGA-Based Reconfigurable Computers Using BORPH", Department of Electrical Engineering and Computer Science—University of California, Berkeley, Oct. 22-25, 2006; pp. 259-264.

* cited by examiner

METHOD AND SYSTEM FOR PREEMPTIBLE COPROCESSING

FIELD OF THE INVENTION

This invention relates to cloud computing, and, more particularly, to methods and systems that support preemptible coprocessing.

BACKGROUND

Cloud computing systems allow users to remotely access computer resources, and so to load and execute various computing tasks. In recent years, such systems have begun to supplant the use of stand-alone computers in data centers and other such environments. A cloud computing system, using some number of computers, can include multiple distributed servers connected by way of a network. In such a distributed system, computational resources, storage resources, and the like are typically made available to a user via a network connection to such resources. As a result, such distributed systems can provide high quality of service to users, regardless of their location.

Certain cloud computing systems employ servers with multiple processors. In certain architectures, such multiple processors can include general-purpose processing units (e.g., one or more central processing units (CPUs)), well as more specialized processing units (e.g., graphics processing units (GPUs)). Depending on the computing task(s) being executed, one or more of the servers in a data center supports multiple processors (e.g., a CPU and a GPU) can encounter situations in which such a server's CPU is in use by a computing task, but its GPU is not needed by the computing task being executed. Such situations result in unused computing capacity, and reduced overall efficiency of the data center in question.

BRIEF DESCRIPTION OF THE DRAWINGS

The embodiments of the present application may be better understood, and its numerous objects, features, and advantages made apparent to those skilled in the art by referencing the accompanying drawings.

Figure 1:
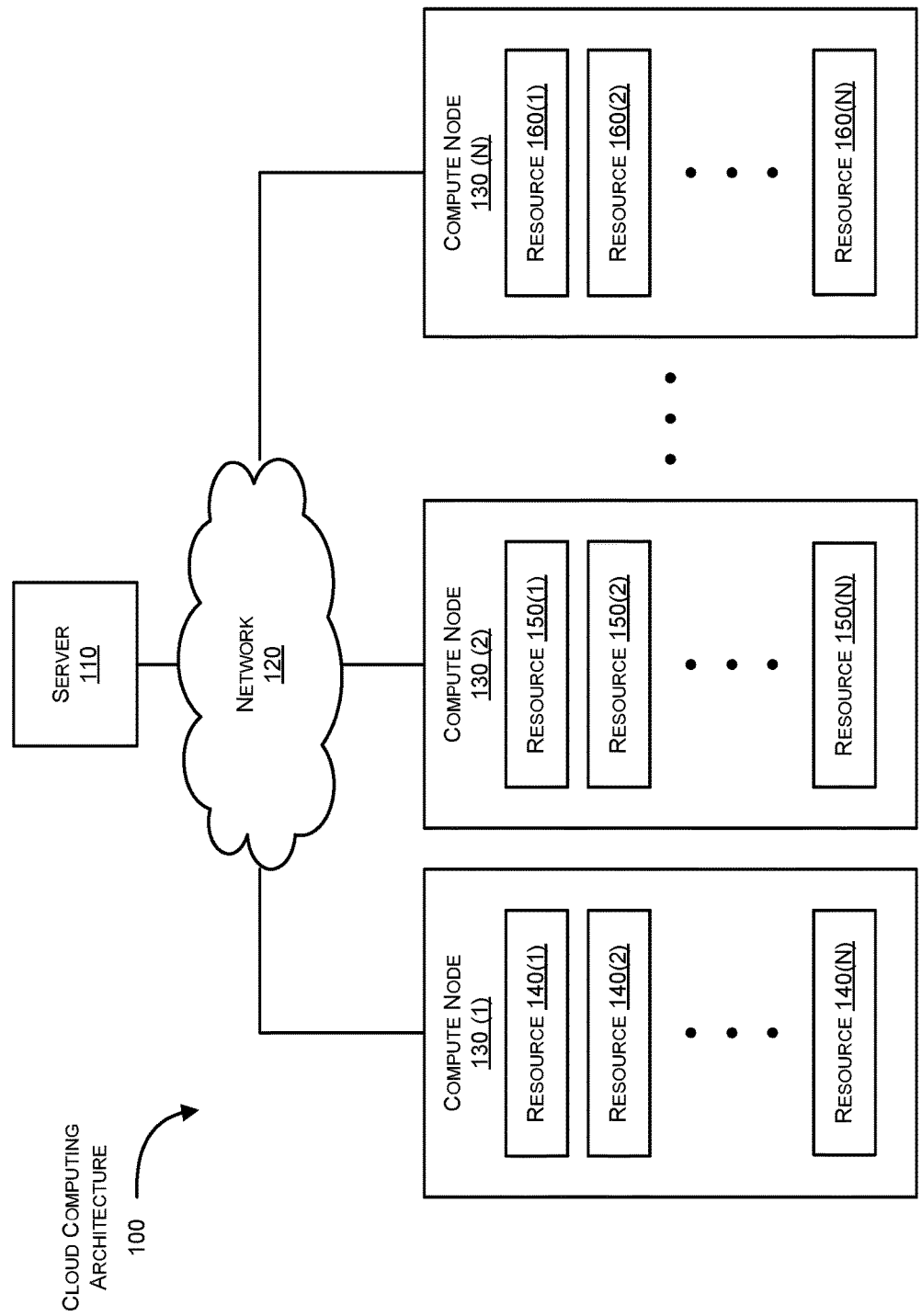
FIG. 1 is a block diagram illustrating an example of a cloud computing architecture, according to methods and systems such as those disclosed herein.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention is described below in connection with several embodiments, the invention is not intended to be limited to the specific forms set forth herein. On the contrary, it is intended to cover such alternatives, modifications, and equivalents as can be reasonably included within the scope of the invention as defined by the appended claims.

Introduction

Methods and systems such as those described herein provide the ability to utilize available resources in a cloud computing environment more efficiently. More particularly, in systems that provide both processors (e.g., general-purpose processors such as CPUs) and coprocessors (e.g., non-general-purpose processors such as graphics processing units (GPUs), field-programmable gate arrays (FPGAs), digital signal processors (DSPs), and the like), methods and systems such as those described herein are able to more efficiently utilize such coprocessors and their associated computational resources (and so employing separate memory (e.g., one or more corresponding local memory units), which are separate from one another, e.g., through their being distinct from one another), storage, and/or other such hardware elements), without regard to compute jobs or sub-tasks (or other such portions) thereof processed by processors associated therewith. Further, methods and systems such as those described herein support the preemption of (or otherwise interrupting) compute jobs (and/or one or more of the sub-tasks (or other such portions) thereof) executed or otherwise serviced by such coprocessors, in various situations. Techniques such as those described herein provide such preemption in a fast and efficient manner.

To this end, preemption of compute jobs (and/or one or more of the sub-tasks (or other such portions) thereof)

executed or otherwise serviced by such coprocessors is made possible by way of support in both hardware architecture and software implementation of methods and systems such as those described herein. For example, in a system in which processors and coprocessors are implemented in a node, and so share communication paths, execution of different compute jobs (or more simply, jobs) on various ones of such processors and coprocessors can be effected by way of separate communications with such processors and coprocessors, and in so doing, facilitate execution of separate compute jobs/sub-tasks by each. In certain embodiments, such preemption is facilitated by the containerization of such compute jobs, and the sub-tasks (or other such portions) thereof. Such containerization permits the fast and efficient provisioning and de-provisioning of compute jobs and their sub-tasks, improving both the responsiveness and efficient use the available computation. Further, such containerization also provides for the migration of compute jobs and/or their sub-tasks. In this regard, the distinctions between interruption (broadly, an action that interrupts execution of the given compute job and/or sub-task) and preemption (in which, upon interruption of an existing compute job/sub-task, the preempting compute job/sub-task takes over the compute node/component in question) will be appreciated.

Thus, by providing the ability to employ what might otherwise be unused (or at least, underutilized) coprocessors, as well as to preempt execution of a compute job employing one or more such (otherwise unused) coprocessors, a system according to methods and systems such as those described herein is able to offer improved utilization of the computational resources available in a cloud computing environment, for example. Such advantages are of particular note in cloud computing environment in which such computational resources are made available to compute jobs time-share such computational resources, using only as much time and computational resources as requested therefor or needed thereby. Conversely, from provider's standpoint, co-processors in such systems that might otherwise stand idle can be called into service, proving both the efficient use of such resources and improving returns on the capital investments made by the organization in assembling such systems and offering such services.

Example Cloud Computing Architecture

FIG. 1 is a block diagram illustrating an example of a cloud computing architecture, according to methods and systems such as those disclosed herein. FIG. 1 thus illustrates a cloud computing architecture 100. As FIG. 1 illustrates, a cloud computing architecture such as cloud computing architecture 100 can include a server 110 coupled to a network 120, as well as a number of compute nodes (depicted in FIG. 1 as compute nodes 130(1)-(N), referred to collectively as compute nodes 130). Each of compute nodes 130 can include one or more computing resources such as resources 140(1)-(N), resources 150(1)-(N), and 160(1)-(N), among other such resources, as depicted in FIG. 1. The compute resources of a given one of compute nodes 130 can take any number of forms, including computational components (e.g., central processing units (CPUs), graphics processing units (GPUs), field-programmable gate arrays (FPGAs), digital signal processors (DSPs), and other such devices), storage devices (e.g., including hard disk drives, solid-state disk drives (SSDs), and other such computer-readable storage mediums), communications interfaces (e.g., network interfaces, radio frequency interfaces, and other such communications interfaces), and the like. Examples of such compute nodes and their operation can be found, for example, in U.S. patent application Ser. No. 13/449,003, filed on Apr. 17, 2012, entitled "Reconfigurable Cloud Computing," now U.S. Pat. No. 8,775,576, which issued on Jul. 8, 2014, which is hereby incorporated by reference in its entirety and for all purposes as if completely and fully set forth herein. Of particular interest to the present discussion, computing resources such as resources 140, 150, and 160, can be viewed as hardware devices, such as those capable of performing computations and/or storing digital information.

Figure 2A:
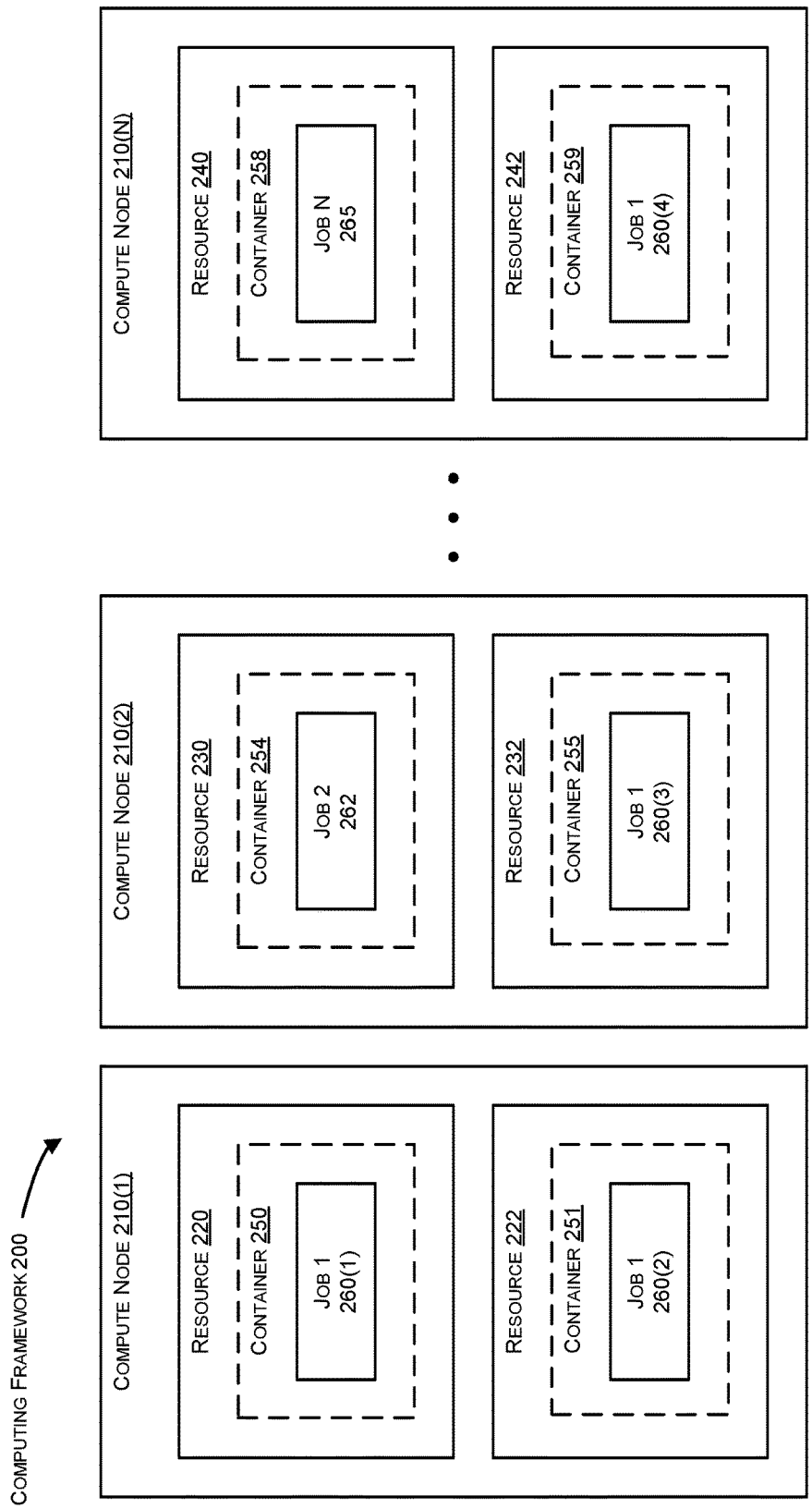
FIG. 2A is a block diagram illustrating an example of a computing framework, according to methods and systems such as those disclosed herein.

FIG. 2A is a block diagram illustrating an example of a computing framework, according to methods and systems such as those disclosed herein. FIG. 2A thus illustrates a computing framework 200 that includes a number of compute nodes (as depicted in FIG. 2A as compute nodes 210(1)-(N), referred to in the aggregate as compute nodes 210). Each of compute nodes 210 includes one or more resources (depicted in FIG. 2A as resources 220, 222, 230, 232, 240, and 242). Each of the resources depicted in FIG. 2A, in turn, is configured to execute one or more containerized jobs. For example, a container 250 for a job 1 260(1) is loaded into resource 220 for execution. Similarly, a container 251 is executed by resource 222, a container 254 is executed by resource 230, a container 255 is executed by resource 232, container 258 is executed by resource 240, and container 259 is executed by resource 242. Examples of containerized execution can be found, for example, in U.S. patent application Ser. No. 14/541,877, filed on Nov. 14, 2014, entitled "Dynamic Creation and Execution of Containerized Applications in Cloud Computing" (which in turn claims the domestic benefit of U.S. Provisional Patent Application No. 61/905,259, entitled "Dynamic Creation and Execution of Containerized Applications in Cloud Computing," filed Nov. 17, 2013), which is hereby incorporated by reference in its entirety and for all purposes as if completely and fully set forth herein. As will be appreciated in light of the present disclosure, containerization of compute jobs (and/or one or more of the sub-tasks (or other such portions) thereof) allow for the fast and efficient provisioning and de-provisioning of such compute jobs/sub-tasks. This is at least because such containerized compute jobs/sub-tasks (referred to collectively herein as units of execution) can, for example, be maintained as complete units of execution (entire runtime environments), including one or more applications, application dependencies, libraries and other binaries, and configuration information needed for the execution thereof, bundled into a package that can be maintained, provisioned, replicated, executed, and deprovisioned as a unit. By containerizing an application platform and its dependencies, the abstraction that such constructs provide also allows differences in operating systems, distributions, underlying infrastructure, and the like to be removed as considerations.

As will be appreciated, then, the compute jobs being serviced by compute nodes 210 (depicted in FIG. 2A as compute jobs 260(1)-(4) (also referred to as compute job 1, compute job 2, and compute job N)) are serviced by respective ones of resources 220, 222, 230, 232, 240, and 242, either in whole or in part, as may be advantageous for the scheduling thereof. Each of compute nodes 210, as depicted in FIG. 2A, include, for example, a computing resource such as a CPU (depicted in FIG. 2A as resources 220, 230, and 240), and coprocessors (depicted in FIG. 2A as resources 222, 232, and 242). Each of compute jobs 1, 2, and N (as well as, for example, compute jobs 3-(N−1); not shown) employ a corresponding one or more resources (e.g., resources 220, 230, and 240), which represents utilization of CPUs and their respective services. However, job 1, in addition to being serviced by resource 220 within container 250, is also serviced by the coprocessors represented by resources 222, 232, and 242 (those sub-tasks being executed within containers 251, 255, 259). That being the case, compute job 1 (260(2)) within container 251 is serviced by the coprocessor represented by resource 222; compute job 1 (260(3)) within container 255 is serviced by the coprocessor represented by resource 232; and compute job 1 (260(4)) within container 259 is serviced by the coprocessor represented by resource 242. Resources 222, 232, and 242 are, in the example of FIG. 2A, coprocessors such as GPUs and/or FPGAs, and so, as a result of the architecture employed in compute nodes 210, able to function independently of their respective CPUs (e.g., depicted in FIG. 2A as resources 220, 230, and 240). An example of such an architecture is now described in connection with FIG. 2B.

Figure 2B:
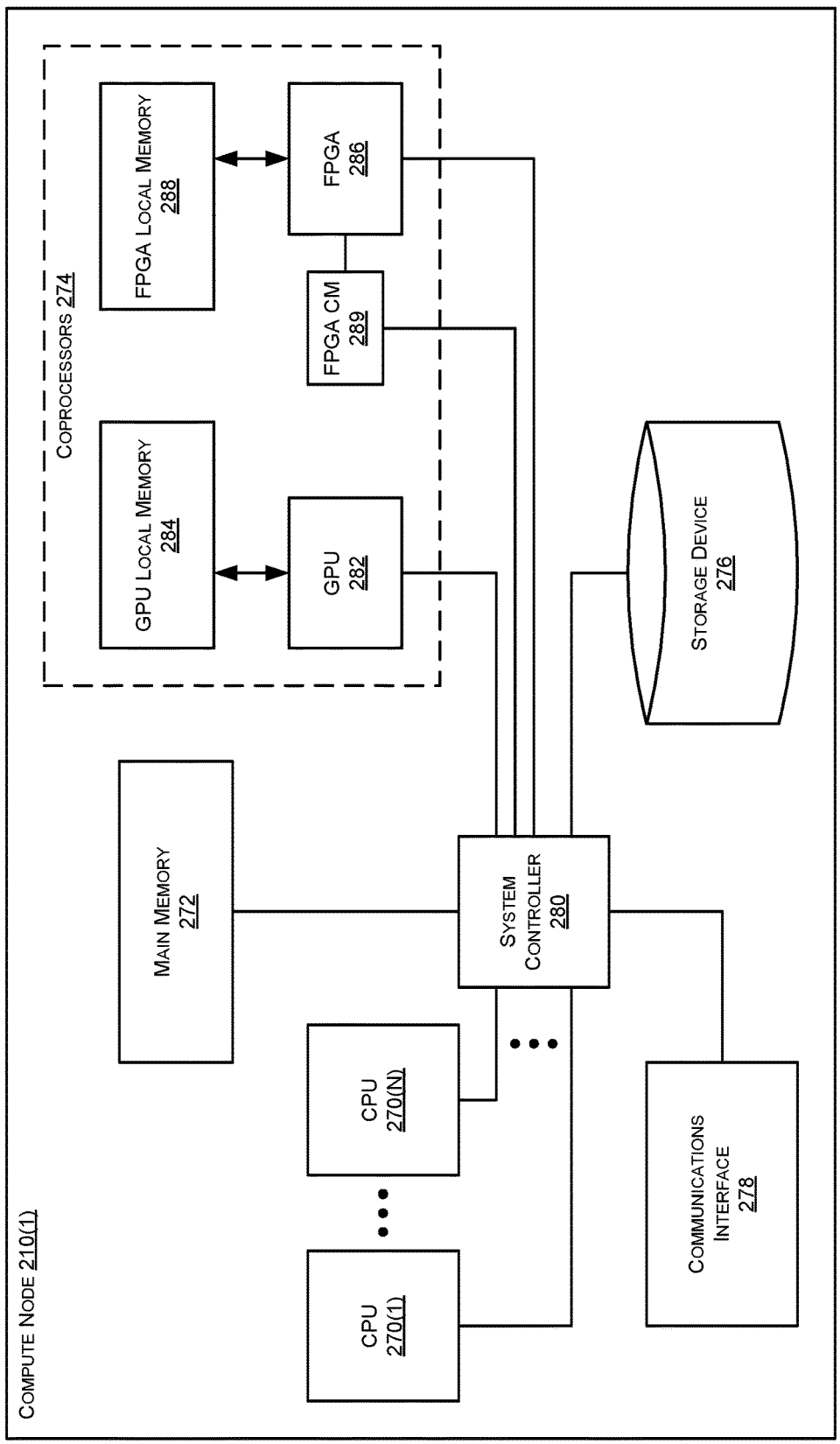
FIG. 2B is a block diagram illustrating an example of a compute node, according to methods and systems such as those disclosed herein.

FIG. 2B is a block diagram illustrating an example of a compute node, according to methods and systems such as those disclosed herein. FIG. 2B thus depicts one of compute nodes 210, as an example of an architecture that can be used to implement compute node 210(1) (although it will be appreciated that the architecture employed in any given one of compute nodes 210 can vary in its particular architecture, and that compute nodes 210 need not be homogenous in their architectures). Thus, in the example depicted in FIG. 2B, compute node 210(1) is depicted as including one or more CPUs (depicted in FIG. 2B as CPUs 270(1)-(N), which can, in certain embodiments, include associated local memory (not shown)), main memory 274, one or more coprocessors (depicted in FIG. 2B as coprocessors 276), one or more storage devices (depicted in FIG. 2B as a storage device 276, and one or more communications interfaces (depicted in FIG. 2B as a communications interface 278). Coupling the aforementioned components in the example presented in FIG. 2B is a system controller 280, which controls the one or more busses used to allow such components to communicate with one another (either by sharing one or more such busses, by communication via system controller 280, or by some combination thereof). For example, in this regard, system controller 280 can support communications with coprocessors 276 and communications interface 278 by way of a bus architecture implementing a high-speed serial computer expansion bus standard such as PCIE (Peripheral Component Interconnect Express), for example, while other communications can be facilitated by way of other busses that facilitate communications between CPUs 270(1)-(N) and main memory 272, as well as those or other busses facilitating communication with storage device 276. CPUs 270(1)-(N), GPU 282, and FPGA 286 can also access communications interface 278, and thus communicate with other compute nodes and management servers (e.g., server 110). Alternatively, a system controller such as system controller 280 (or some other mechanism, as can be implemented using a bus master/slave technique) can be implemented in a single bus architecture such as that described in connection with FIG. 11 subsequently.

As is also illustrated in FIG. 2B, coprocessors 276 include one or more coprocessors, which can be homogeneous or heterogeneous. In the example presented in FIG. 2B, coprocessors 276 include a GPU and an FPGA (depicted in FIG. 2B, respectively, as a GPU 282 (with its local memory 284) and an FPGA 286 (with its local memory 288)). As will be appreciated in light of the present disclosure, coprocessors 276 can include other specialized processors and/or logic as well (not shown), including specialized processors and/or logic such as, for example, DSPs, gate arrays, custom application-specific integrated circuits (ASICs), and the like. In certain embodiments, FPGA 286 includes not only logic elements configurable in the aforementioned manner, but also includes one or more processing cores, the operation and configuration of which can also be controlled in the manner now described, for example. Also depicted as part of coprocessors 276, and associated with FPGA 286, is an FPGA configuration memory (CM) 289. In one embodiment, FPGA CM 289 is implemented using, for example, a programmable memory that stores a bit stream or other such information (e.g., as can be provided thereto by one of the aforementioned busses), and so support configuration of FPGA 286. In supporting such functionality, FPGA CM 289 facilitates configuration/reconfiguration of FPGA 286 by a given compute job or workflow, on a case-by-case basis, and so provides additional alternatives for configuring compute nodes such as computed nodes 130 as may be necessary or advantageous to the situation at hand. As will be appreciated in light of the present disclosure, such programming of FPGA 286 can be effected by way of one or more of the aforementioned components and busses. Such functionality provides for the programming of FPGA 286, for example, as part of the provisioning and execution of the compute job in question (e.g., as part of the provisioning of the compute job's containerized instance, or that of one of its sub-tasks (or other such portions thereof)).

As can be seen in FIG. 2B, system controller 280 can support multiple busses (as well as multiple other intra-compute node communications paths supported by the given compute node), and so provides for communication with one or more of CPUs 270(1)-(N) and coprocessors 274 (including, e.g., GPU 282 and FPGA 286). Such various intra-compute node communications paths can be employed by components of the given compute node, for example, using a single (arbitrated) bus, multiple busses, or a combination thereof, to communicate with communications interface 278 (and so other such compute nodes and servers (e.g., by a network such as network 120 of FIG. 10)). By supporting such communications paths (or at least, providing the ability to communicate individually thereby), a compute node according to methods and systems such as those described herein facilitates such methods and systems by providing other compute nodes, and servers, the ability to communicate with those components. In so doing, a compute node architecture such as that depicted in FIG. 2B allows such components to operate independently, such that one or more of CPUs 270(1)-(N) can execute all or a portion of one compute job, while one or more of coprocessors 274 execute all or a portion of another compute job. As will be appreciated in light of the present disclosure, in fact, given the independence of CPUs 270(1)-(N) and coprocessors 274 from one another, and the independence as between ones of coprocessors 274 (e.g., as between GPU 282 and FPGA 286), the containerized (and possibly replicated) compute jobs and sub-tasks supported by architectures such as that depicted in FIG. 2B allow different ones of such units of execution to be executed by CPUs 270(1)-(N) and ones of coprocessors 274. Further, different ones of such units of execution can be executed as between ones of CPUs 270(1)-(N). Given such an architecture, a flexible computing fabric can be envisioned, which can be exploited to full advantage by units of execution according to methods and systems such as those described herein.

Figure 3:
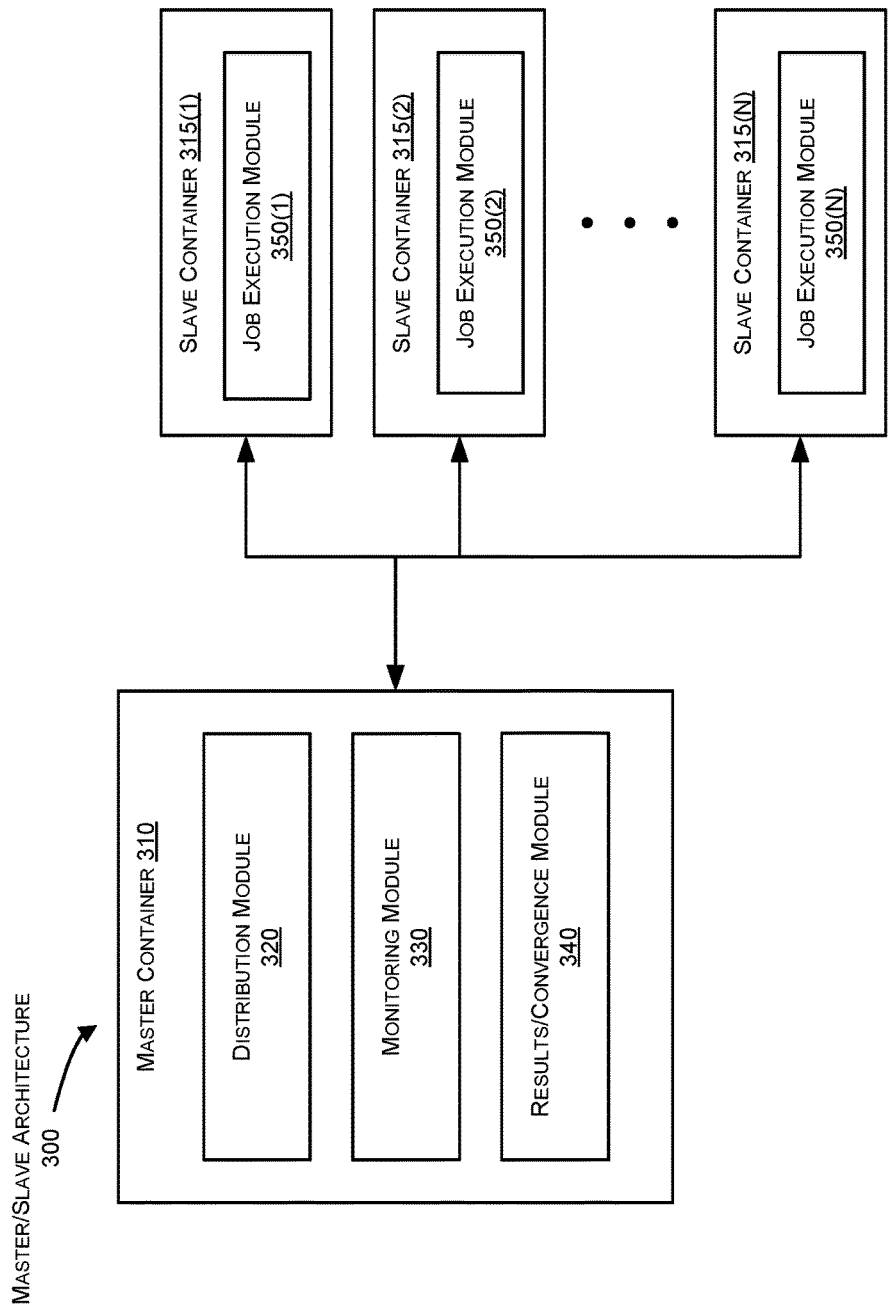
FIG. 3 is a block diagram illustrating an example of a master/slave architecture, according to methods and systems such as those disclosed herein.

FIG. 3 is a block diagram illustrating an example of a master/slave architecture, according to methods and systems such as those disclosed herein. As will be appreciated, then, FIG. 3 depicts a master/slave architecture 300. Master/slave architecture 300 includes a master container 310 and a number of slave containers (depicted in FIG. 3 as slave containers 315(1)-(N), referred to in the aggregate as slave containers 315). In turn, master container 310 includes a distribution module 320, and monitoring module 330, and results/convergence module 340. Each of slave containers 315 includes a corresponding job execution module (depicted in FIG. 3 as job execution modules 350(1)-(N), and referred to in the aggregate as job execution modules 350). As will be appreciated in light of the present disclosure, each of job execution modules 350 represents, for example, various ones of job 1 260(1)-(4) of FIG. 2A. Thus, the various modules for a given job within a master container such as master container 310 are related to the instances of a given job that will be distributed to various of the processors (and more particularly, coprocessors) within the cloud computing architecture performing such processing. Thus, in master/slave architecture 300, a job that includes distribution module 320, monitoring module 330, and results/convergence module 340 will create (or at least, employ) a number of instances of a job execution module that will be executed on one or more coprocessors of the compute nodes (or components thereof) employed. That being the case, distribution module 320 determines which coprocessors are to be enlisted in the execution of the compute job (and so, the respective job execution modules), and will also be responsible for the distribution of such efforts as between the requisite resources. Master container 310 (and more specifically, distribution module 320) can, in certain embodiments, also be tasked with the instantiation of job execution modules 350 (and so, slave containers 315). In the example depicted in FIG. 3, then, distribution module 320 distributes job execution modules 350 between the requisite number of resources (coprocessors) within their respective slave containers 315. Once distributed thusly, monitoring module 330 of master container 310 will monitor the progress of each of job execution modules 350, and make determinations as to successful completion, the need for restarting, and other such management functions. As job execution modules 350 complete their respective processing, results/convergence module 340 gathers the results thus produced for integration and ultimate storage thereof.

Example Processes for Preemptible Coprocessing

Figure 4:
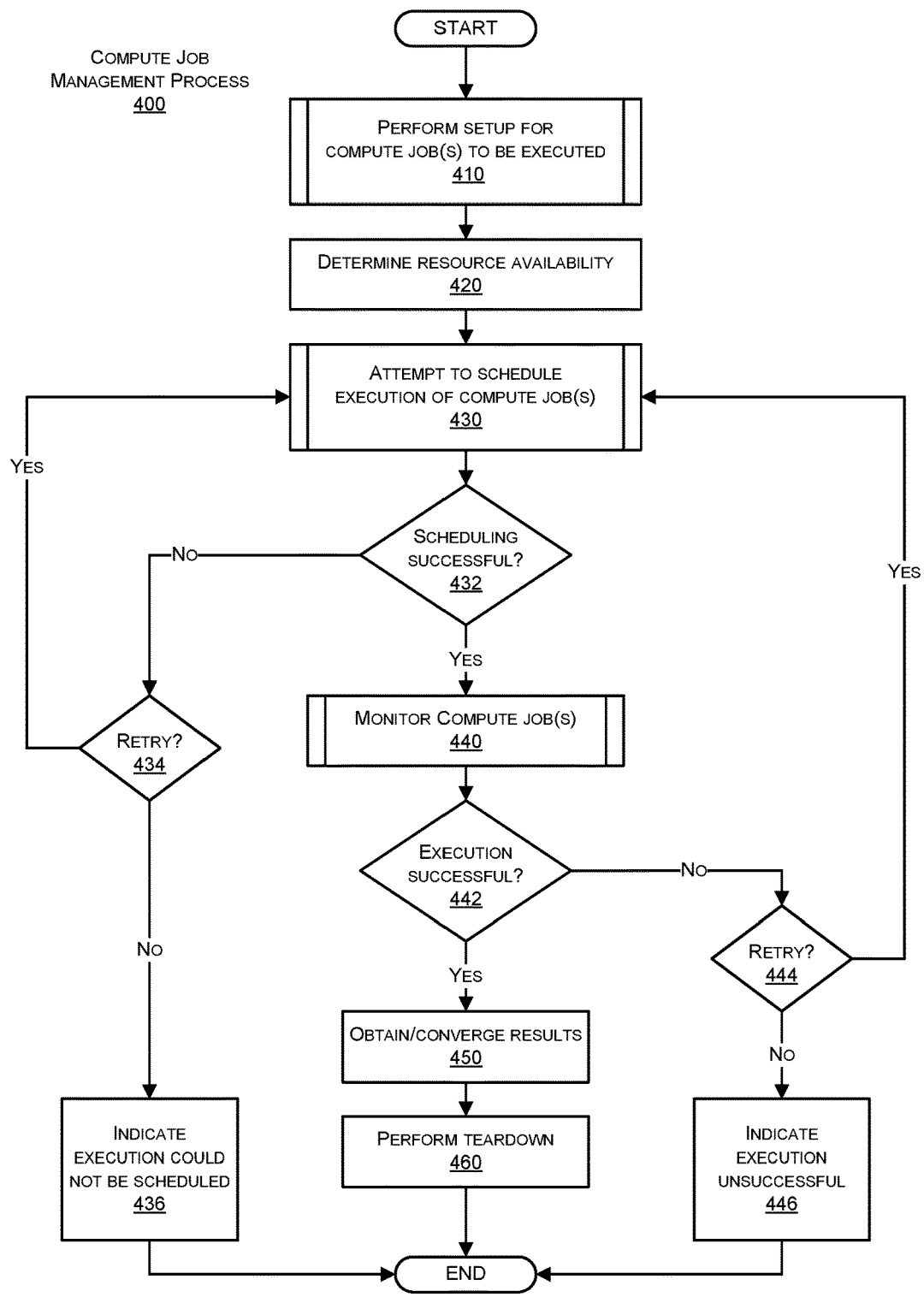
FIG. 4 is a simplified flow diagram illustrating an example of a compute job management process, according to methods and systems such as those disclosed herein.

FIG. 4 is a simplified flow diagram illustrating an example of a compute job management process, according to methods and systems such as those disclosed herein. FIG. 4 thus illustrates an example of a compute job management process (depicted in FIG. 4 as the compute job management process 400). Compute job management process 400 includes the set up, execution, monitoring, and deprovisioning of compute jobs within a cloud computing architecture such as cloud computing architecture 100 of FIG. 1. Compute job management process 400 begins by performing set up operations related to the execution of one or more compute jobs (410). Such set up operations can include the identification of one or more compute jobs, sub-tasks of such compute jobs, and other such operations. An example of operations that can be performed in setting up a compute job to be executed is described in greater detail in connection with FIGS. 5A and 5B, subsequently.

Once the compute jobs to be executed have been set up, one or more determinations are made as to the availability of the resources needed to execute the compute job(s) (and/or sub-tasks) in question (420). For example, whether performed by a server such as server 110, one of the compute nodes (e.g., compute notes 130), or some other device or mechanism, determination of the available resources can be effected by polling one or more of the compute nodes, by reference to one or more data structures in which such information is maintained, or by some other appropriate method. Further in this regard, with regard to the architecture and functional capabilities described in connection with FIGS. 2A and 2B, a compute node's element can be polled as part of compute job management process 400 (and its sub-processes) to determine the availability of such resources. Further still, in making such a determination, compute job management process 400 can query such compute nodes/components, in order to determine not only availability, but the appropriateness of the functional capabilities of each of the one or more of the compute nodes/components thus queried. For example, if a certain type of GPU, FPGA, or other coprocessor is required by a given unit of execution, compute nodes/components can be polled to determine the availability of coprocessors having those particular capabilities.

Using the resource availability thus determined, compute job management process 400 can attempt to schedule execution of the compute job(s) (and/or sub-tasks) (430). An example of a process for attempting to schedule execution of one or more compute jobs is presented in connection with FIGS. 6A and 6B, which are described in greater detail subsequently. As will be appreciated in light of the present disclosure, such an attempt can include not only efforts to schedule execution of the given unit(s) of execution by the available compute nodes/components, but also comprehends efforts made to make such compute nodes/components available by way of migrating one or more units of execution to other (available and appropriate) compute nodes/components. In view of such units of execution being containerized, such migration can be further simplified and more efficient than typical standalone software applications. The use of containerized units of execution, in some embodiments, also provides for maintenance of state information therein, further simplifying such migration. In performing such migration, the compute nodes/components to which the unit(s) of execution is (are) migrated would typically need to support some minimal set of functionalities, though migration to a compute node/component providing a superset thereof is acceptable. That said, it will be appreciated that preferably, the management of such considerations (e.g., by a master in an architecture such as that described in greater detail in connections with FIG. 3, above) takes into consideration the opportunity cost of enlisting compute nodes/components that exceed the requirements of the unit of execution at hand. Thus, for example, it is more desirable to migrate a given unit of execution to a compute node/component that just meets the needs of the given unit of execution, rather than one which far exceeds such needs (and which could be more fully utilized (at a higher rate of compensation) by a unit of execution having greater needs (or needs that might be satisfied in a at least a more remunerative fashion), thereby improving the return-on-investment (ROI) of the overall system (e.g., data center))

A determination is then made as to whether the attempt to schedule execution of the compute jobs was successful (432). If the attempt to schedule execution of the compute job(s) was unsuccessful (432), a determination is made as to whether another attempt should be made (434). If another attempt is to be made, compute job management process 400 proceeds with making such an attempt (430). Such a new attempt can include, in some embodiments, relaxing compute node/component requirements, easing restrictions on migration of units of execution by allowing for migration of existing units of execution to compute nodes/components having greater capabilities than necessary (so, e.g., taking more of an efficiency/ROI loss on such migrations than might otherwise be the case), and other such measures, in order to improve the likelihood of scheduling the unit(s) of execution successfully.

Alternatively, if no further attempts are to be made, compute job management process 400 proceeds with providing an indication that execution of the compute job(s) could not be successfully scheduled (436). Compute job management process 400 then concludes.

Alternatively, if an attempt to schedule execution of the one or more compute jobs is successful (430 and 432), compute job management process 400 then monitors the execution of the compute jobs (440). An example of a process for monitoring compute job execution is presented in great detail in connection with FIG. 7, subsequently.

Once execution and monitoring of the compute job(s)/sub-task(s) has concluded (regardless of such execution's success or failure), a determination is made as to whether the unit(s) of execution were successfully executed, or failed in some regard (442). If the compute job(s)/sub-task(s) were not successfully executed, a determination is then made as to whether execution should be re-attempted (444). If such is the case, compute job management process 400 proceeds to attempt scheduling of execution of the compute jobs once again (430) and monitoring of such compute job execution (440). If another attempt to successfully execute the unit(s) of execution is not to be made, the unsuccessful execution of the one or more compute jobs/sub-tasks is indicated (446). Compute job management process 400 then concludes.

Alternatively, if execution of the one or more compute jobs/sub-tasks was successful (442), the result of such execution are obtained from the various compute nodes/components involved and converged (or otherwise combined), as needed, and made available to the user (e.g., as by way of the storage of such results) (450). As noted elsewhere herein, while such convergence will vary by application, using the example of frames in a digital video file (and so, a highly parallel processing scenario), resulting data from the compute nodes/components are converged by receiving the results of processing each frame and stitching such results together into a final sequence of frames. If the results for one or more frames are not received, such failures can be addressed, for example, by redistributing the missing frame's data to an appropriate compute node/component, and stitching in such results into the final sequence, once received. Other examples of such highly parallel processing include distributed rendering, gene sequencing, and most big data analytics. In such environments, individual pipelines can operate independently of one another, and their results converged subsequently (e.g., a compute job is executing on one compute node to render a section of an image, while hundreds of other compute jobs are rendering other sections of the image at the same time—coordination is not needed until it's time to save the entire rendering).

Alternatively, in a tightly coupled execution scenario, convergence is typically much more constant and coordinated as a compute job executes. Tightly coupled execution, as used herein, means algorithms that "direct" different pipelines to perform different functions based on the data at hand, although producing results more quickly can be hamstrung by the dependencies involved. Examples of tightly coupled algorithms include simulation (e.g., computational fluid dynamics), deep neural network training (which involves passing data between "layers" and making comparison decisions on individual data points in parallel), and other such applications. The ability to recognize and manage such dependencies (or lack thereof) give rise to the operations presented as part of the examples illustrated in FIGS. 5A and 5B, described in detail subsequently.

Scheduling and execution of the one or more compute jobs having been successful, compute job management process 400 then proceeds with "tearing down" the set up for the one or more compute jobs/components by, for example, deprovisioning containers, disposing of objects, releasing resources, setting hardware devices to known states, and the like (460). Compute job management process 400 then concludes.

Figure 5A:
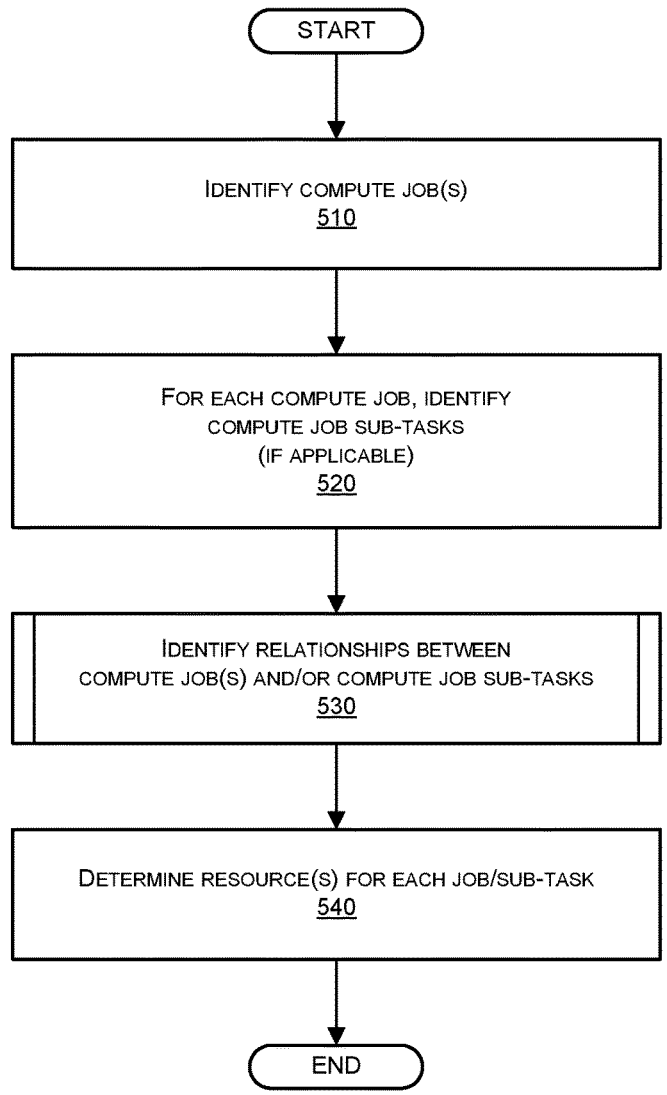
FIG. 5A is a simplified flow diagram illustrating an example of a compute job set-up process, according to methods and systems such as those disclosed herein.

FIG. 5A is a simplified flow diagram illustrating an example of a compute job set-up process, according to methods and systems such as those disclosed herein. FIG. 5 thus illustrates examples of operations that can be performed in a compute job set-up process 500. Compute job set up process 500 begins with the identification of one or more compute jobs that are to be executed (510). Next, for each such compute job, any sub-tasks of the compute job are identified (if any) (520). Relationships between compute jobs/sub-tasks (e.g., as to the use of one job's output as the input to another job, the various resources needed by each job and each job's sub-tasks (if any), and the like) are identified (530). Such relationships can be important where dependencies exist as between units of execution. Advantageously, such dependencies can, in certain scenarios, be avoided (or at least minimized) through the use of the aforementioned containers. In such cases, each such containerized unit of execution can be distributed to and executed by a respective compute node/component, thereby allowing each such unit of execution to perform its own processing, independent of that of others of the units of execution of a given compute job. In using such an approach, methods and systems according to the present disclosure are able to distribute units of execution for execution, and, for those units of execution that do not successfully complete, simply redistribute those units of execution for another attempt at execution, thereby iterating until such time as all (or a sufficient number) of such units of execution have been successfully executed. Having made a determination as to the one or more compute jobs to be executed, as well as sub-tasks of those compute jobs, and relationships therebetween, a determination is made as to the resources(s) needed for each compute job (540). Compute job set up process 500 then concludes.

Figure 5B:
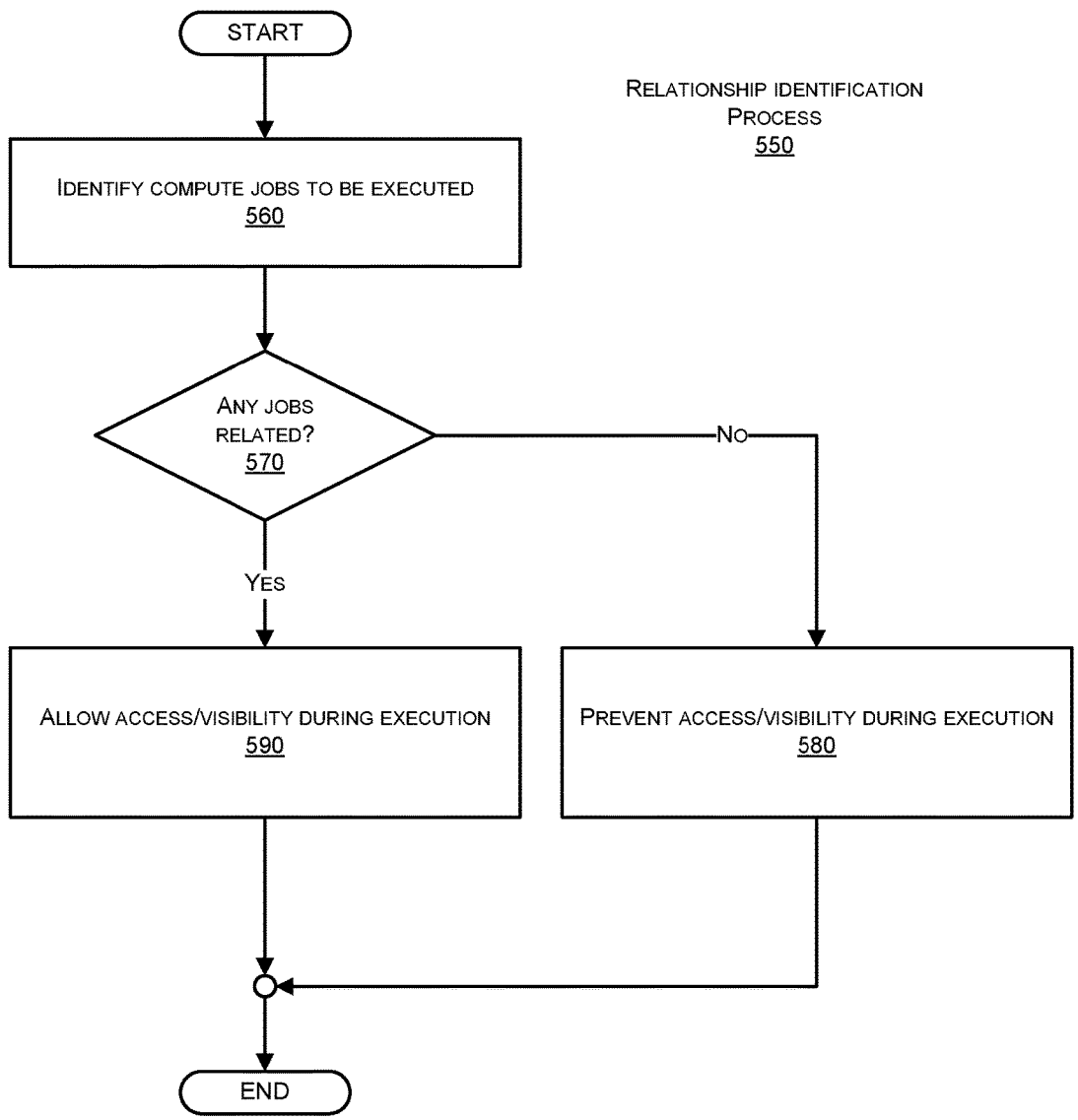
FIG. 5B is a simplified flow diagram illustrating an example of a relationship identification process, according to methods and systems such as those disclosed herein.

FIG. 5B is a simplified flow diagram illustrating an example of a relationship identification process, according to methods and systems such as those disclosed herein. FIG. 5B thus illustrates an example of a relationship identification process 550. Relationship identification process 550 begins with the identification of the compute jobs that are to be executed (560). Next, a determination is made as to whether any of the compute jobs thus identified are related to one another (570). For example, this determination can include any input/output relationships between compute job sub-tasks, between compute jobs themselves, use of common data, and the like. Further, even if such relationships do not exist as between the compute jobs in question, it will be appreciated that such interdependencies can exist as between the sub-tasks of a given compute job. As will be appreciated in light of the present disclosure, the determination as to relationships between compute jobs also comprehends the identification of such "inter-sub-task" relationships. If, within a given set of compute jobs, no such relationships exist, access/visibility during execution of the compute jobs need not be provided (580). Alternatively, in cases of relationships existing between compute jobs, access/visibility during execution of such compute jobs can be allowed (590). Relationship identification process 550 then concludes.

Figure 6A:
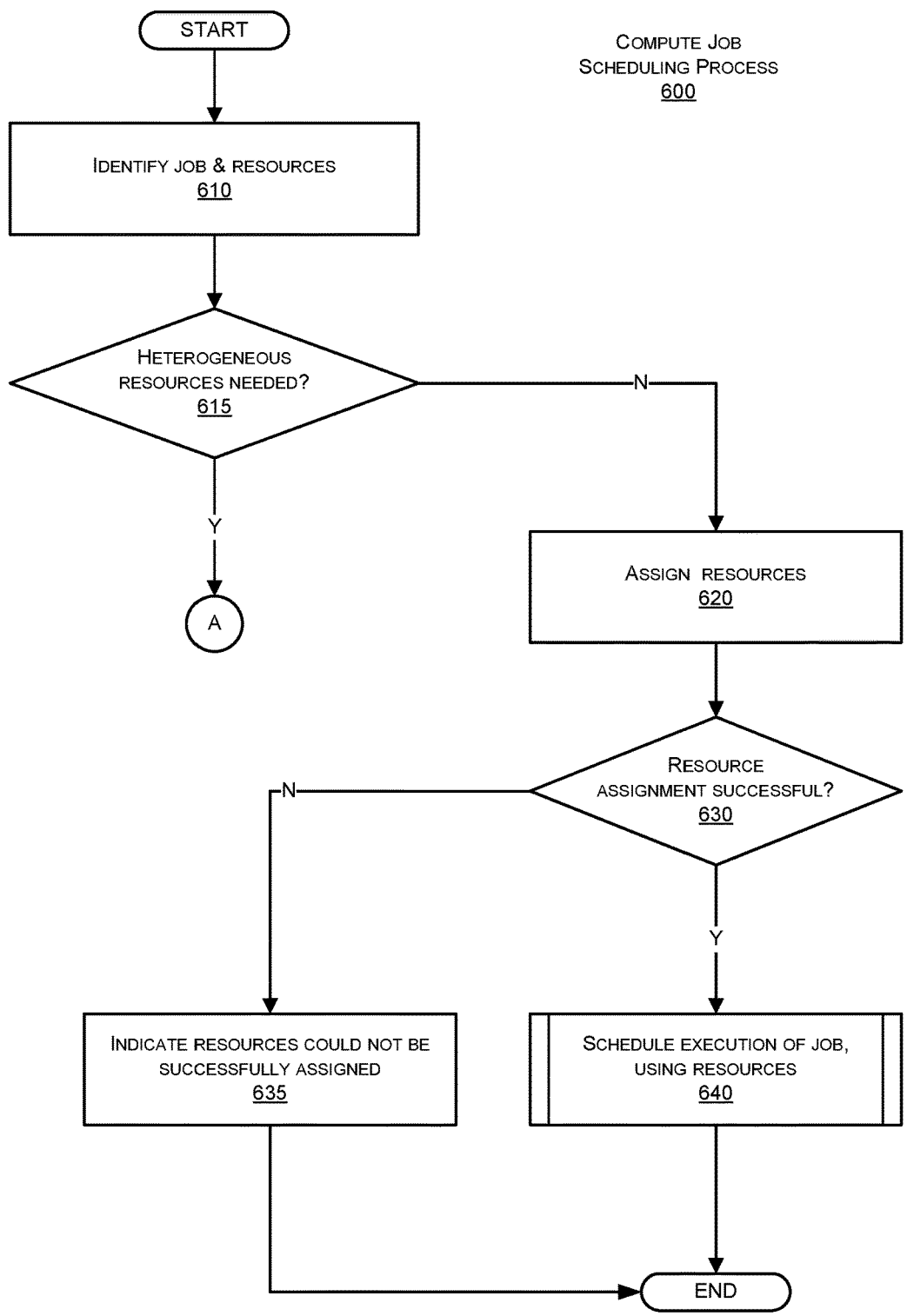
FIGS. 6A and 6B is are simplified flow diagrams illustrating an example of a compute job scheduling process, according to methods and systems such as those disclosed herein.
Figure 6B:
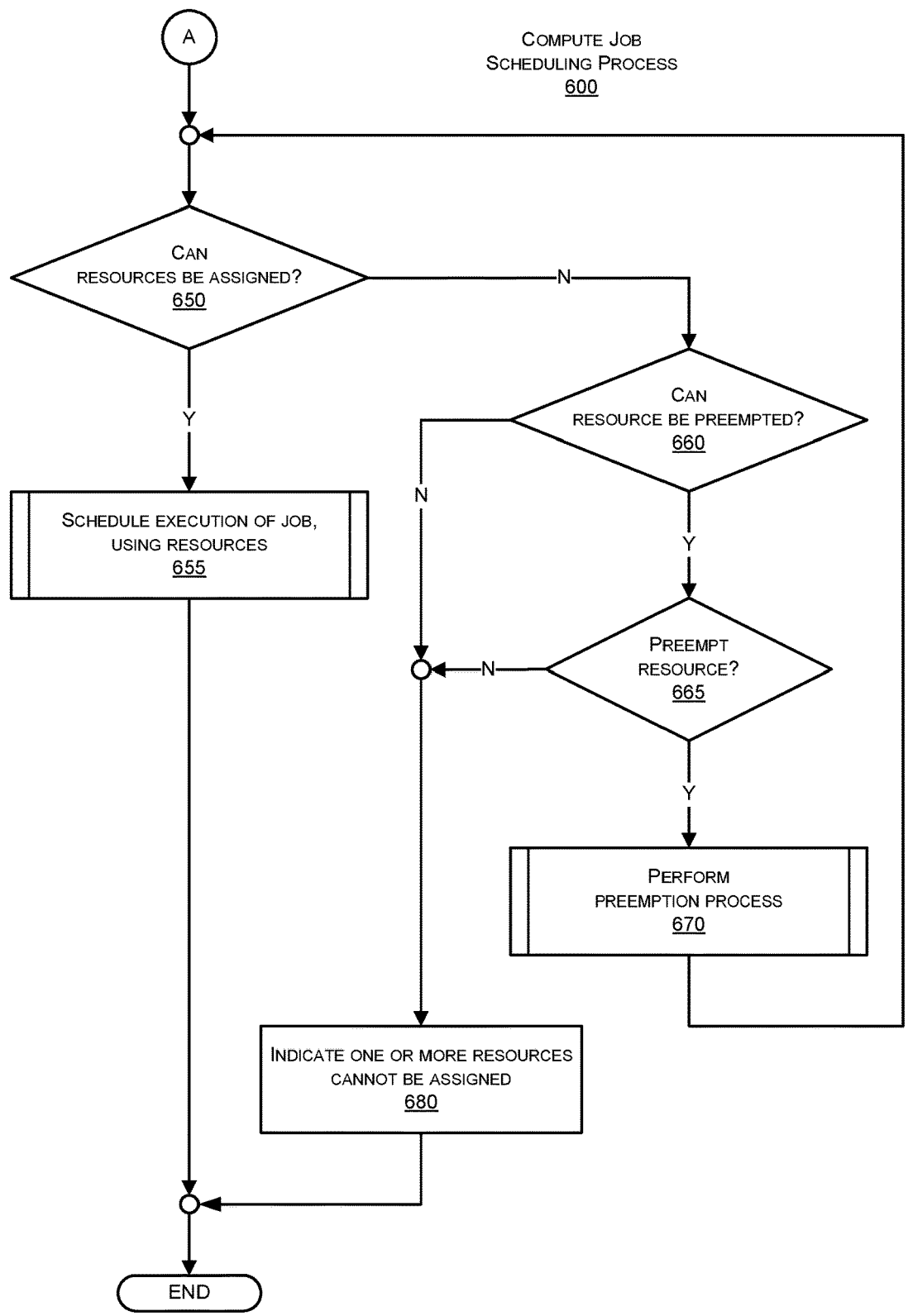

FIGS. 6A and 6B illustrate simplified flow diagrams depicting an example of a compute job scheduling process, according to methods and systems such as those disclosed herein (and depicted as a compute job scheduling process 600). Compute job scheduling process 600 begins with the identification of the given one of the compute jobs to be executed (or a sub-task thereof), as well as the identification of the resources needed by the given compute job (e.g., compute nodes and/or components thereof) (610). A determination is then made as to whether the resources needed by the compute job are heterogeneous (615). If the resources needed by the compute job are heterogeneous, compute job scheduling process 600 proceeds to the portion of compute job scheduling process 600 depicted in FIG. 6B, by way of connector A.

In the alternative (and so, remaining on FIG. 6A), if the resources needed by the compute job are not heterogeneous (i.e., are homogeneous), an attempt is made to assign the requisite resources, in view of the resources available (620). As will be appreciated, in such a scenario, the assignment process is simpler than that in which heterogeneous resources are needed, at least because, in the former situation, a given unit of execution can be assigned to any of the available resources. Such homogeneous resources can be, for example, generic resources (i.e., fungible resources), such as multiple CPUs (e.g., CPUs 270(1)-(N) of FIG. 2B) or other such general-purpose processors. A determination is then made as to whether such resource assignment was successful (630). If the resources needed by the given compute job are unavailable, and indication is made to this effect (635). Compute job scheduling process 600 then concludes. As noted in connection with FIG. 4, such an indication of unavailability will result in either an attempt by compute job management process 400 to retry the scheduling of execution, or the termination of that process. In the alternative, if the resources needed by the given compute job are available, execution of compute job using such resources is scheduled (640). Compute job scheduling process 600 then concludes. Examples of operations with respect to the scheduling of a compute job's execution is described in greater detail in connection with FIG. 7, subsequently.

Turning now to FIG. 6B, in the case in which heterogeneous resources are needed for the execution of the given compute job (615), a determination is made as to whether the necessary resources can be assigned (650). In this case, where the requisite resources are heterogeneous, certain issues can arise. For example, given that the requisite resources are heterogeneous (and so, are not fungible), only certain resources can meet the needs of the units of execution to be executed. This limits the resources that might be used to satisfy the requirements of a given one of the units of execution. Further, such heterogeneity comprehends a variety of possible situations, including those in which both general purpose processors (e.g., including a general purpose processing unit such as a central processing unit (CPU)) and coprocessors (e.g., GPUs and FPGAs) are needed. In such scenarios, if efforts are to be made to satisfy the given compute job's processing request, a determination may need to be made as to whether one or more other compute jobs' use of such resources should be preempted. To this end, if the resources necessary for the execution of the given compute job can be assigned, execution of the compute job using those resources is scheduled (655). Compute job scheduling process 600 then concludes.

Alternatively, if one or more of the resources needed for the execution of the given compute job or a subtask thereof cannot be assigned (e.g., due to failure, use by another unit of execution of either the same compute job or that of another compute job, or the like) (650), a determination is made as to whether the one or more resources are preemptible (e.g., the one or more resources are now in use by another compute job, but that use can be migrated elsewhere or otherwise preempted) (660). If such resources are preemptible (e.g., the result of being in use, rather than of a failure), a determination is made as to whether the given resource should be preempted (665). Such a determination goes to whether preemption is acceptable in the given circumstance (e.g., the applicable policies indicate that preemption of the other compute job's use thereof is acceptable). If the one or more resources can be preempted and preemption is acceptable under the prevailing policies (660 and 665), a preemption process is performed (670). Compute job scheduling process 600 then returns to the determination as to whether necessary resources are now available (650). If either the one or more resources cannot be preempted (660) or are not preemptible (665), an indication is made to the effect that one or more of the resources needed to the execution of the given compute job cannot be assigned (680). Compute job scheduling process 600 then concludes.

Figure 7:
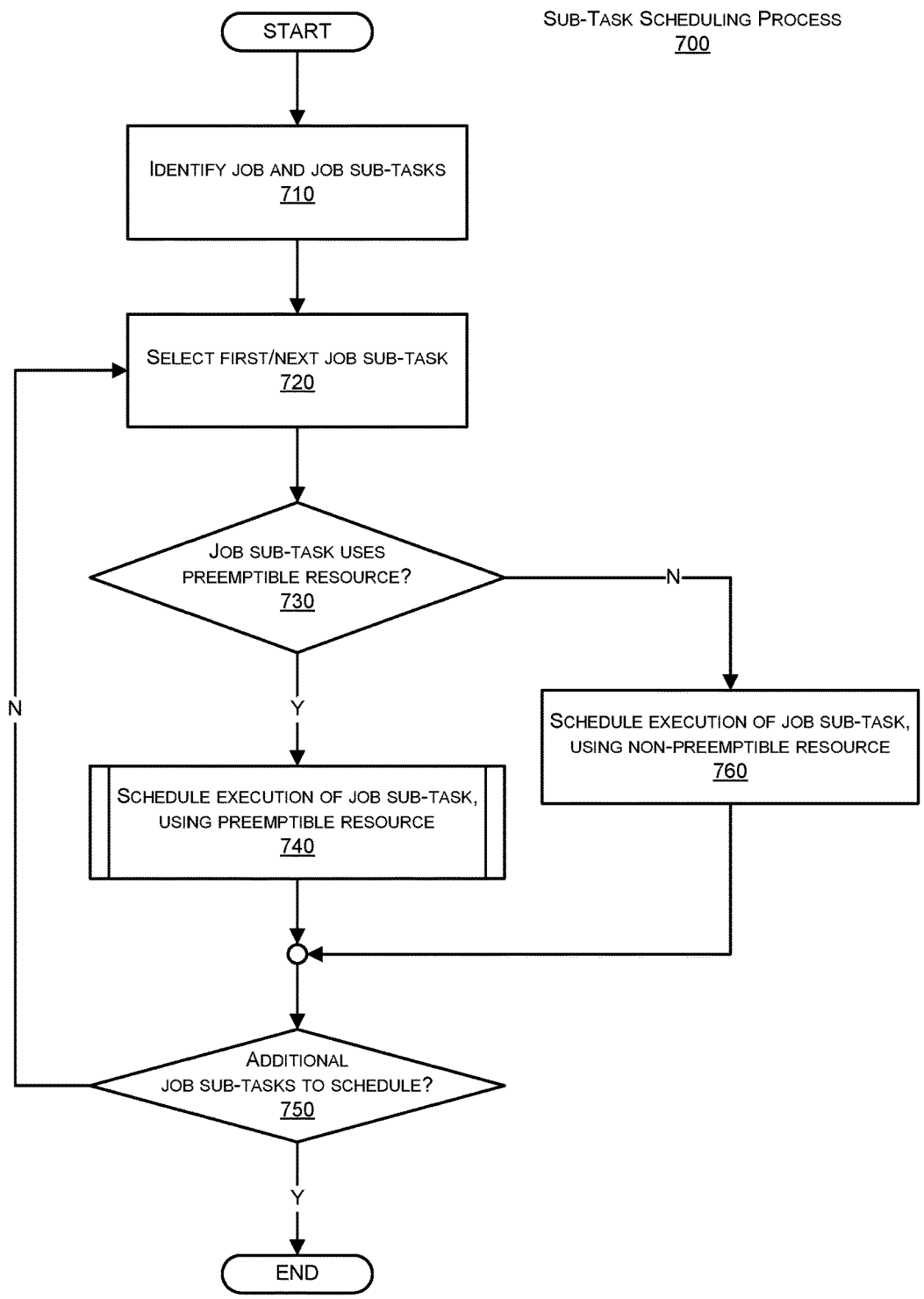
FIG. 7 is a simplified flow diagram illustrating an example of a sub-task scheduling process, according to methods and systems such as those disclosed herein.

FIG. 7 is a simplified flow diagram illustrating an example of a sub-task scheduling process, according to methods and systems such as those disclosed herein. FIG. 7 thus illustrates an example of a sub-task scheduling process 700. Sub-task scheduling process 700 begins with the identification of the compute job in question and any sub-tasks of the compute job (710). Next, a selection operation is performed, in order to select a given sub-task of the compute job to be executed (720). A determination is then made as to whether the given compute job sub-task uses a resource that is preemptible (730). If the compute job sub-task uses a preemptible resource, execution of the compute job sub-task is scheduled for execution using the preemptible resource (740). In the alternative, if resource utilized by the compute job sub-task is not preemptible, execution of the compute job sub-task is scheduled for execution using the non-preemptible resource (760). Execution of the compute job's sub-task having been scheduled in either event, a determination is made as to whether additional compute job sub-tasks remain to be scheduled (750). If additional compute job sub-tasks remain to be scheduled, sub-task scheduling process 700 returns to selecting the next compute job sub-task (720), and sub-task scheduling process 700 continues. In the alternative, there being no further compute job sub-tasks to schedule for the given compute job, sub-task scheduling process 700 concludes.

Thus, as will be appreciated in light of the present disclosure, sub-task scheduling process 700 provides for the scheduling of sub-tasks of the given computer job, for execution by the appropriate compute node/component. In the manner of computer job scheduling process 600, sub-task scheduling process 700 makes a determination as to whether the requisite compute node(s)/component(s) used by the given sub-task are preemptible. For example, if a sub-task of a compute job utilizes a coprocessor (e.g., a GPU or FPGA) and such a coprocessor is not presently available, sub-task scheduling process 700 makes a determination as to whether any of the units of execution, currently using coprocessors of the requisite type, can be preempted. The decision as to whether to preempt a given unit of execution can be based on a number of criteria and parameters. Criteria which can serve to inform such decisions can include, for example, the expected length of time until the current unit of execution relinquishes the resource, the importance of the sub-task and/or compute job, the amount of revenue generated by the existing sub-task versus the preempting sub-task, the ability to migrate the existing sub-task, the availability of resources that meet or exceed the sub-task's requirements and costs thereof, and other such considerations, as well as such criteria vis-à-vis other sub-tasks and compute jobs currently being executed by other compute nodes.

Figure 8:
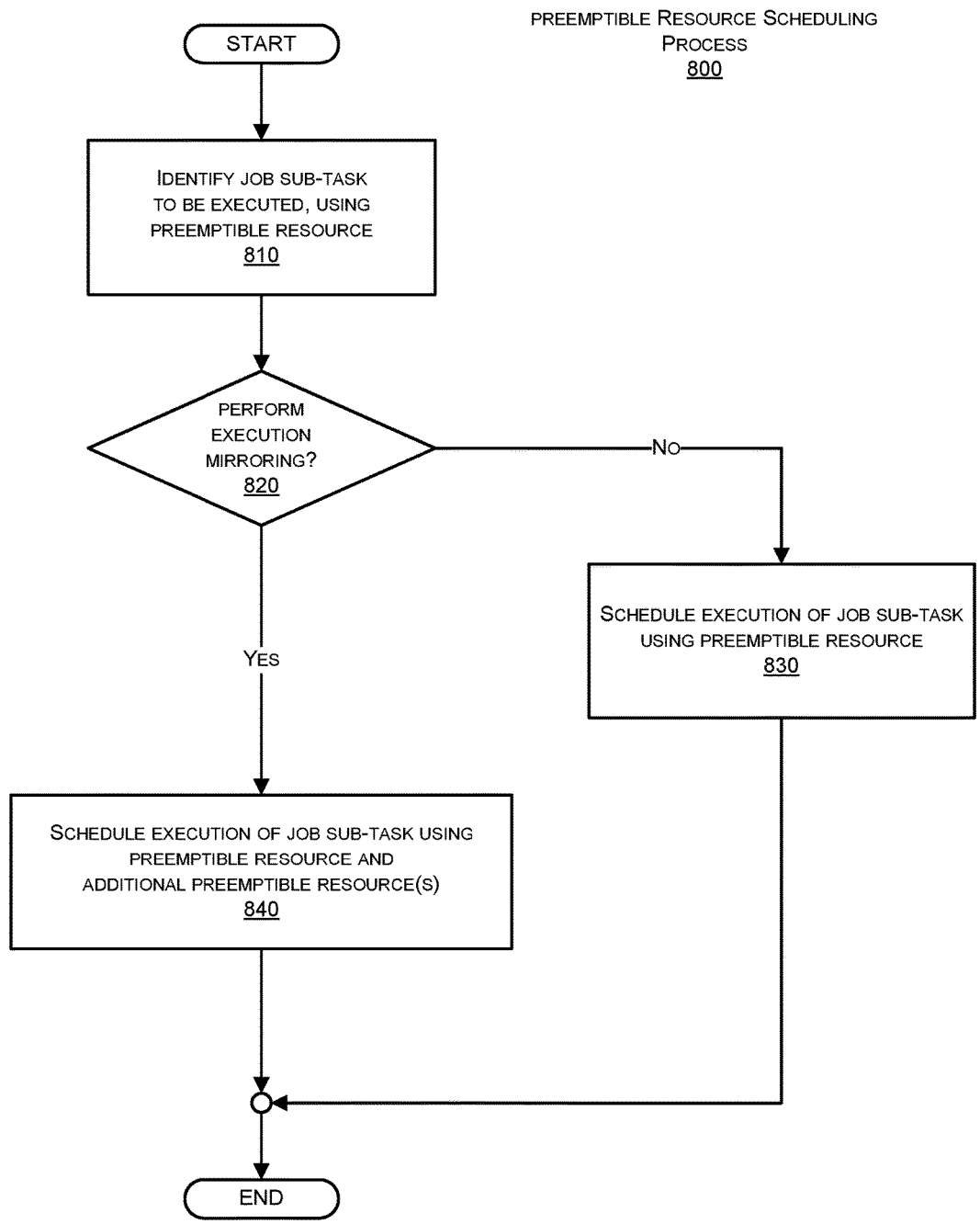
FIG. 8 is a simplified flow diagram illustrating an example of a preemptible resource scheduling process, according to methods and systems such as those disclosed herein.

FIG. 8 is a simplified flow diagram illustrating an example of a preemptible resource scheduling process, according to methods and systems such as those disclosed herein. FIG. 8 thus illustrates an example of a preemptible resource scheduling process 800. Preemptible resource scheduling process 800 begins with the identification of a compute job sub-task to be executed (or otherwise serviced) using the given preemptible resource (810). Having identified the compute job sub-task, a determination is made as to whether execution mirroring is to be performed (820).

In the context of methods and systems such as those described herein, an example of execution mirroring (also referred to herein as replication) is the execution of what is essentially the same sub-task on multiple compute nodes/components, with each such sub-task executing on different data. An example of such a scenario is image processing performed on video frame data. For video data available on a frame-by-frame basis, each such frame can be processed independently of other such frames. In such a situation, a sub-task performing such image processing can be mirrored across a number of compute nodes/components, and, in so doing, the processing of a collection of such frames (e.g., from a scene in a movie) can be spread across a number of compute nodes/components, thereby speeding such processing. Alternatively, execution mirroring can comprehend the execution of different sub-tasks on the same data, with each such sub-task producing results corresponding thereto.

In the case in which execution mirroring is not to be performed, execution of the compute job sub-task is scheduled using the given preemptible resource (830). Alternatively, if execution mirroring is to be performed, execution of the compute job sub-task is scheduled for both the given preemptible resource and additional preemptible resources (840). In either event, such scheduling having been completed, preemptible resource scheduling process 800 then concludes.

Figure 9A:
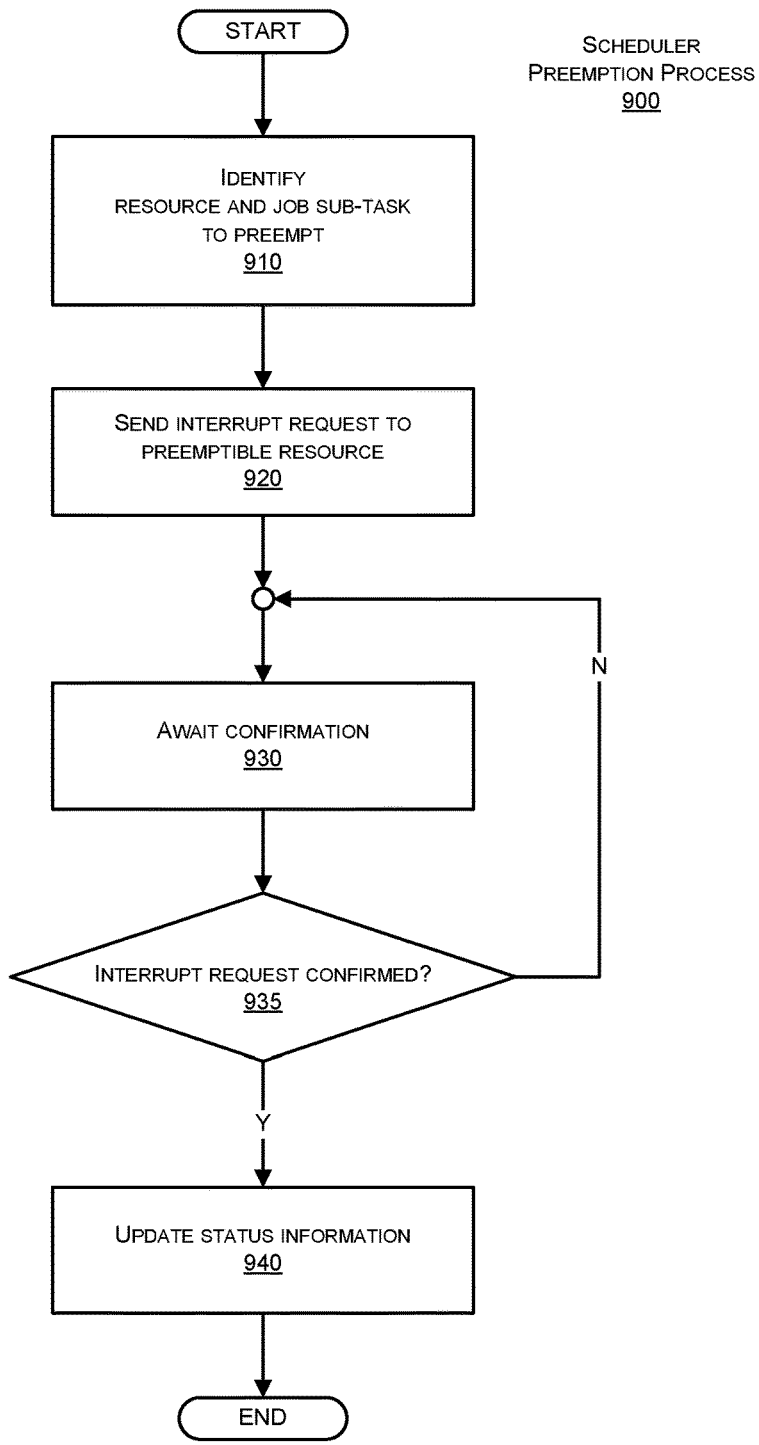
FIG. 9A is a simplified flow diagram illustrating an example of a scheduler preemption process, according to methods and systems such as those disclosed herein.
Figure 9B:
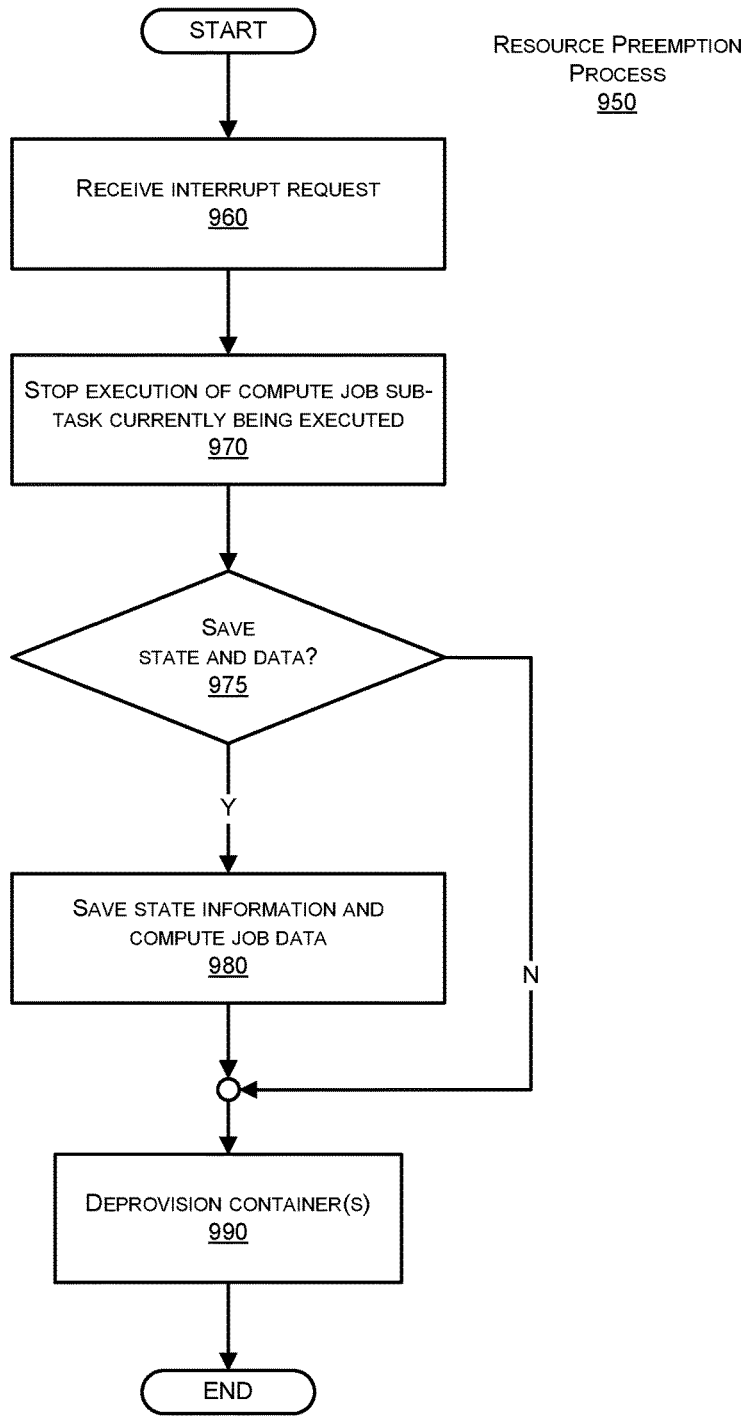
FIG. 9B is a simplified flow diagram illustrating an example of a resource preemption process, according to methods and systems such as those disclosed herein.

FIG. 9A is a simplified flow diagram illustrating an example of a scheduler preemption process, while FIG. 9B is a simplified flow diagram illustrating an example of a resource preemption process, both according to methods and systems such as those disclosed herein. FIGS. 9A and 9B thus illustrate examples of the operations performed by a scheduler preempting a given resource, and a compute node's resource being preempted, respectively. To that end, FIG. 9A illustrates a scheduler preemption process 900. Scheduler preemption process 900 begins with the identification of the given resource(s) and computer job sub-task(s) involved in the preemption (910). An interrupt request is then sent to the preemptible resource thus identified, in order to interrupt (and so preempt execution of a compute job/sub-task using) the given resource of the compute node receiving the interrupt request (920). While no confirmation is received, scheduler preemption process 900 awaits confirmation that the preemptible resource has confirmed the receipt of the interrupt request (930). Thus, a determination is made as to whether the interrupt request has been confirmed (935). Once the successful receipt of the interrupt request has been confirmed, status information regarding the preemptible process is updated (940).

As noted, FIG. 9B illustrates examples of operations that can be performed by a compute node and the preemptible resources thereof. FIG. 9B thus illustrates a resource preemption process 950. Resource preemption process 950 begins with the receipt of an interrupt request pertaining to a preemptible resource of the compute node (960). In response to the receipt of this interrupt request, the preemptible resource ceases execution of the currently executing compute job sub-task (970). Execution of the currently executing compute job sub-task having been preempted (either gracefully or immediately), a determination is made as to whether state information and relevant data for the compute job sub-task just preempted, should be saved (975). If state information and relevant data are to be saved, the compute node takes steps to perform such storage (980). Alternatively, such state information and relevant data may simple be purged upon execution of the preempting compute job sub-task. If the compute job sub-task being preempted was containerized, such container(s) are then deprovisioned (990). Resource preemption process 950 then concludes.

Figure 10:
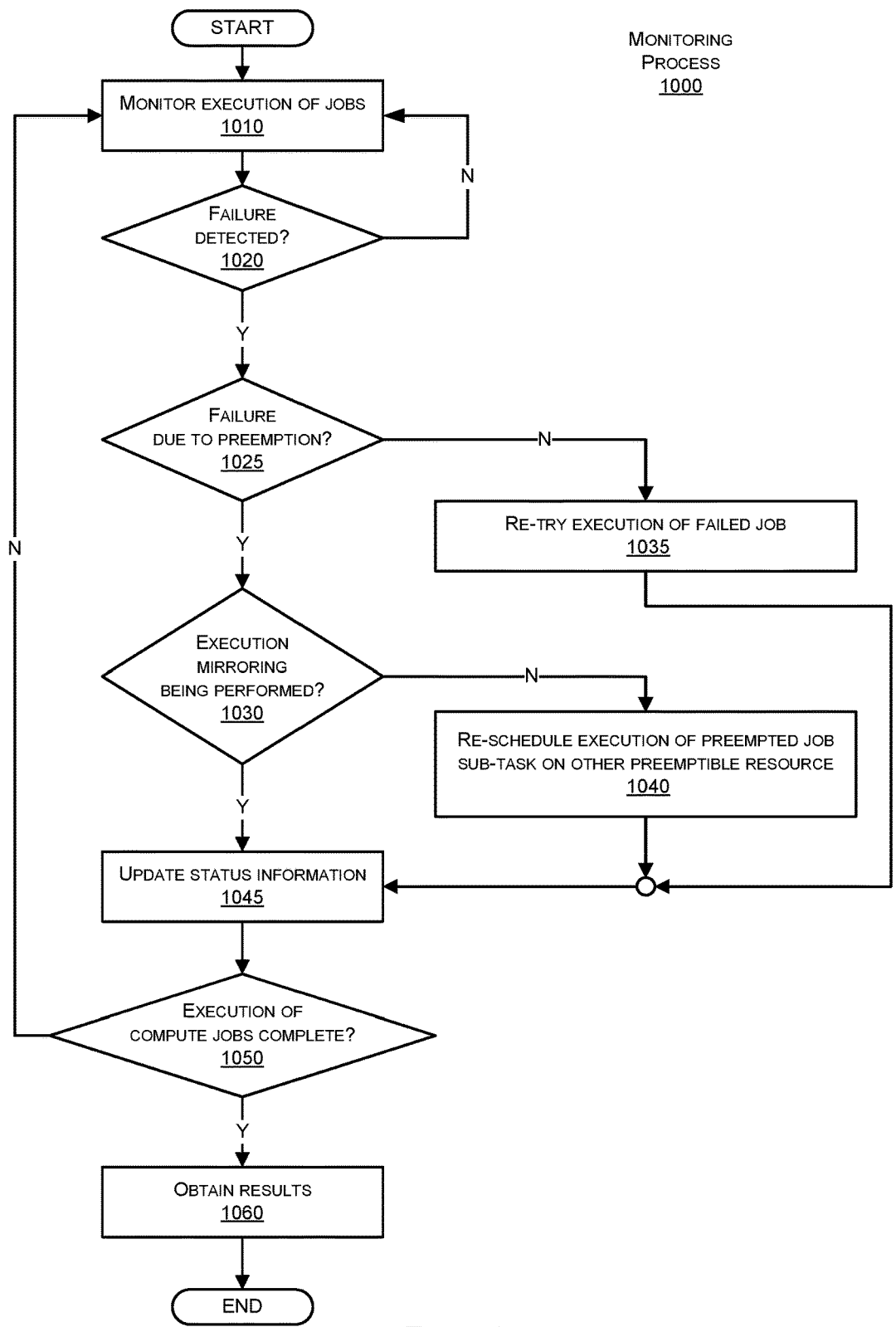
FIG. 10 is a simplified flow diagram illustrating an example of a monitoring process, according to methods and systems such as those disclosed herein.

FIG. 10 is a simplified flow diagram illustrating an example of a monitoring process, according to methods and systems such as those disclosed herein. FIG. 10 illustrates an example of a monitoring process 1000. Monitoring process 1000 begins with the monitoring of execution of one or more compute jobs (1010). So long as a failure is not detected (1020), monitoring process 1000 continues to monitor the execution of the compute jobs. If a failure is detected, a determination is made as to whether the failure encountered was due to preemption (1025). If a given compute job fails due to preemption, a determination is made as to whether execution mirroring is employed by the given compute job (1030). If the failure encountered was not due to preemption, execution of the failed compute job can be retried (1035). Alternatively, if the failure was due to preemption and mirroring is being performed, execution of the preempted compute job sub-task can be rescheduled on another preemptible resource (1040). In either case, status information for the given compute job and/or compute job sub-task is updated (1045). A determination is then made as to whether execution of the compute job(s) in question is (are) complete (1050). If the execution of one or more compute jobs has not yet completed, monitoring process 1000 continues to monitor the execution of the remaining compute jobs (1010). Alternatively, results from the execution of the compute job(s) in question can be obtained (1060). Monitoring process 1000 then concludes.

An Example Computing and Network Environment

As shown above, the systems described herein can be implemented using a variety of computer systems and networks. Examples of such computing and network environments are described below with reference to FIGS. 11 and 12.

Figure 11:
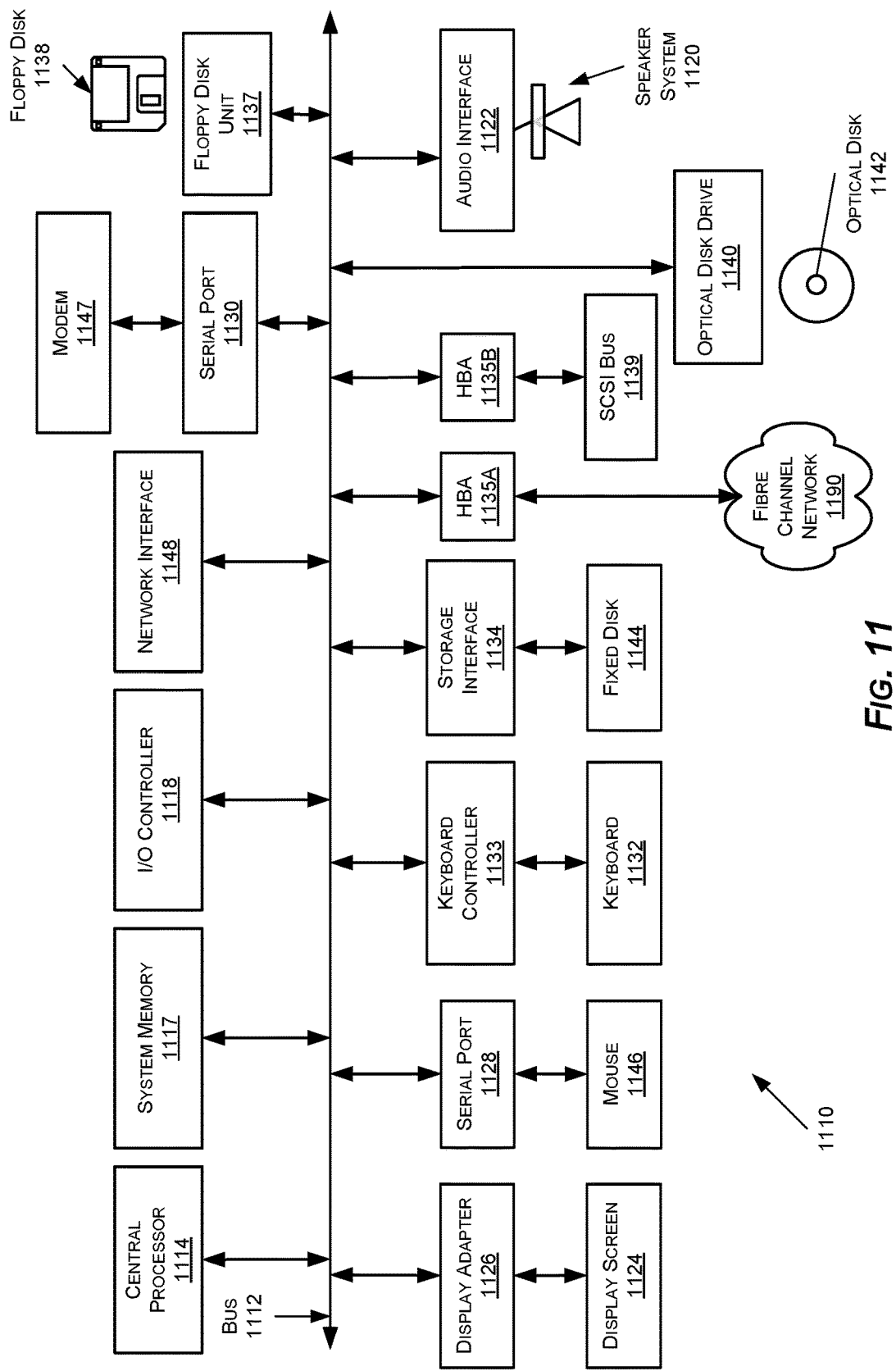
FIG. 11 is a block diagram depicting a computer system suitable for implementing aspects of systems according to embodiments of systems such as those disclosed herein.

FIG. 11 depicts a block diagram of a computer system 1110 suitable for implementing aspects of the systems described herein, and the like. Computer system 1110 includes a bus 1112 which interconnects major subsystems of computer system 1110, such as a central processor 1114, a system memory 1117 (typically RAM, but which may also include ROM, flash RAM, or the like), an input/output controller 1112, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a floppy disk unit 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 is readily known in the art and is not discussed in detail in this application. Code to implement the modules of the systems described herein can be stored in computer-readable storage media such as one or more of system memory 1117, fixed disk 1144, optical disk 1142, or floppy disk 1138. The operating system provided on computer system 1110 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 11 to be present to practice the present invention. The devices and subsystems may be interconnected in different ways from that shown in FIG. 11. The operation of a computer system such as that shown in FIG. 11 is readily known in the art and is not discussed in detail in this application. Code to implement the present invention may be stored in computer-readable storage media such as one or more of system memory 1116, fixed disk 1144, CD-ROM 1142, or floppy disk 1138. Additionally, computer system 1110 may be any kind of computing device, and so includes personal data assistants (PDAs), network appliance, X-window terminal or other such computing device. Computer system 1110 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
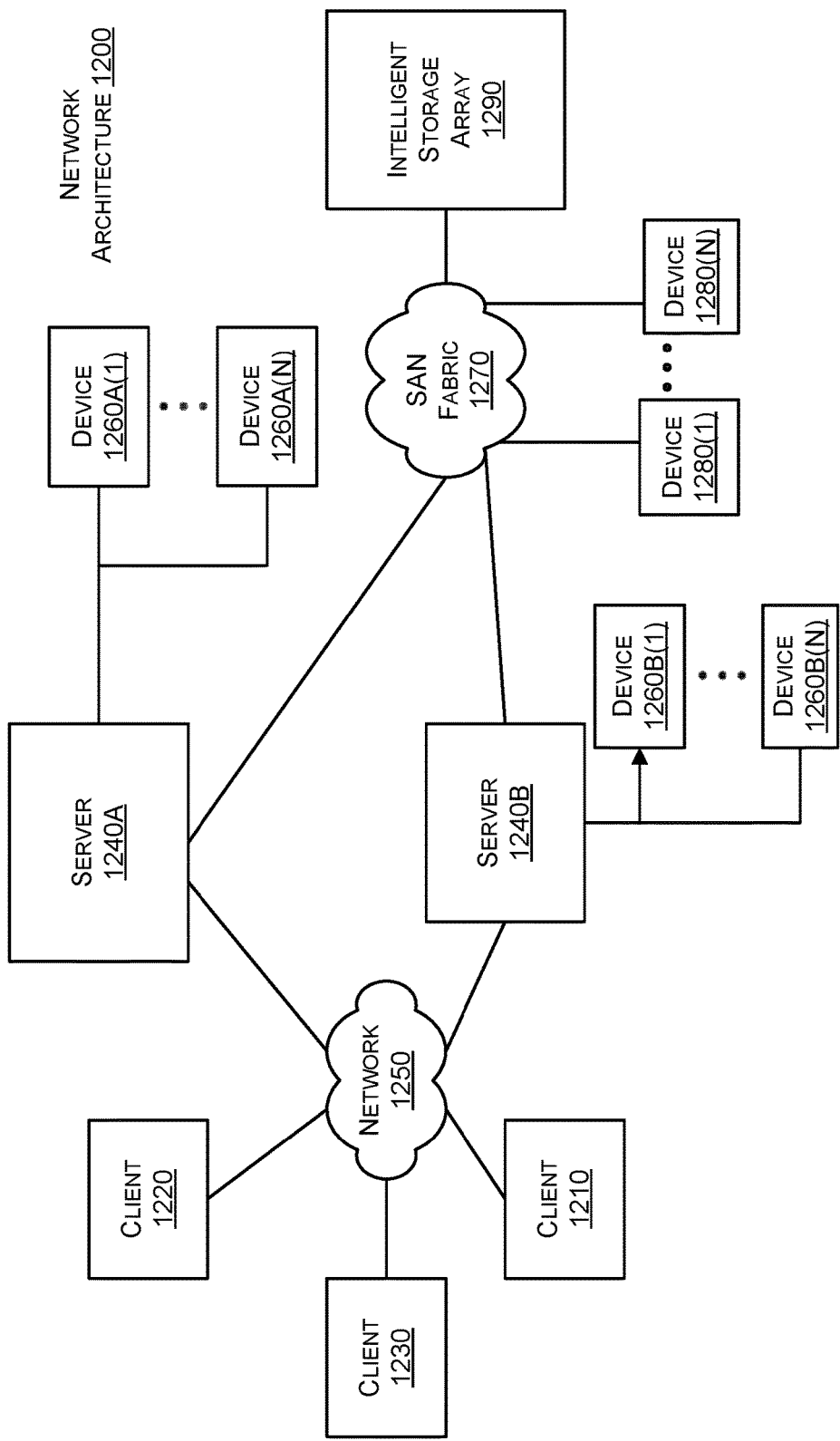
FIG. 12 is a block diagram depicting a network architecture suitable for implementing aspects of systems according to embodiments of systems such as those disclosed herein.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 11 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1110, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

OTHER EMBODIMENTS

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method comprising:
executing at least a portion of a first compute job;
executing at least a portion of a second compute job, wherein
the at least the portion of the first compute job and the at least the portion of the second compute job are configured to be executed at a first compute node comprising a first computing resource and a second computing resource,
the first computing resource comprises a first hardware element,
the second computing resource comprises a second hardware element,
the first hardware element and the second hardware element are separate from one another,
the at least the portion of the first compute job is serviced by the first computing resource, and
the at least the portion of the second compute job is serviced by the second computing resource;

prior to completing execution of the at least the portion of the second compute job, interrupting the execution of the second compute job;

scheduling at least a portion of a third compute job, wherein
the at least the portion of the third compute job is scheduled to be serviced by the second computing resource;

in response to the interrupting, detecting a failure during the execution of the at least the portion of the second compute job; and restarting servicing of the at least the portion of the second compute job, wherein
the restarting is accomplished by causing another computing resource to service the at least the portion of the second compute job, and
the at least the portion of the second compute job is scheduled to be serviced by the another computing resource at a point in time at which the another computing resource becomes available.

2. The method of claim 1, wherein
execution of the at least the portion of the first compute job cannot be interrupted, and
execution of the at least the portion of the second compute job can be interrupted.

3. The method of claim 1, wherein
the first computing resource comprises a central processing unit, and
the second computing resource comprises at least one of
a digital signal processor,
a graphics processing unit, or
a field-programmable gate array.

4. The method of claim 1, further comprising:
scheduling the at least the portion of the second compute job to be serviced by a third computing resource, wherein
the at least the portion of the second compute job is serviced by the third computing resource substantially simultaneously with the servicing of the at least the portion of the third compute job by the second computing resource.

5. The method of claim 1, wherein
the first compute job is unrelated to the second compute job,
the first computing resource, while executing the first compute job, does not have access to the second computing resource,
the first computing resource, while executing the first compute job, does not have visibility of results arising from the executing of the at least the portion of the second compute job by the second computing resource,
the second computing resource, while executing the second compute job, does not have access to the first computing resource, and
the second computing resource, while executing the second compute job, does not have visibility of results arising from the execution of the first compute job by the first computing resource.

6. The method of claim 1, further comprising:
identifying the second computing resource as a resource that can be interrupted during execution of a compute job;
in response to the identifying, requesting interruption of the second compute job;
performing tear down of the second computing resource, as previously configured for the second compute job; and after the performing, reserving the second computing resource to perform the third compute job.

7. The method of claim 1, wherein
the first compute job is executed within a first container,
the second compute job is executed within a second container, and
the third compute job is executed within a third container.

8. The method of claim 1, wherein
communications with the first computing resource occur via a first application program interface,
communications with the second computing resource occur via a second application program interface, and
the first application program interface and the second application program interface are different.

9. A computer system comprising:
one or more processors;
one or more coprocessors;
a system controller, coupled to the one or more processors and the one or more coprocessors;
a computer-readable storage medium coupled to the system controller; and
a plurality of instructions, encoded in the computer-readable storage medium and configured to
cause at least one of the one or more processors to execute at least a portion of a first compute job,
cause at least one of the one or more coprocessors to execute at least a portion of a second compute job, wherein
the at least the portion of the first compute job and the at least the portion of the second compute job are configured to be executed at a first compute node comprising the one or more processors and the one or more coprocessors, and
the one or more processors and the one or more coprocessors are separate from one another,
prior to the at least one of the one or more coprocessors completing execution of the at least the portion of the second compute job, cause interruption of the execution of the second compute job,
schedule execution of at least a portion of a third compute job, wherein
the at least the portion of the third compute job is scheduled to be executed by the at least one of the one or more coprocessors,
in response to interruption of the execution of the second compute job, detect a failure during the execution of the at least the portion of the second compute job; and
restart the execution of the at least the portion of the second compute job, wherein
the execution of the at least the portion of the second compute job is restarted by causing another coprocessor to execute the at least the portion of the second compute job, and
the at least the portion of the second compute job is scheduled to be executed by the another coprocessor at a point in time at which the another coprocessor becomes available.

10. The computer system of claim 9, wherein
execution of the at least the portion of the first compute job cannot be interrupted, and
execution of the at least the portion of the second compute job can be interrupted.

11. The computer system of claim 9, wherein
the at least one of the one or more processors is a general purpose processing unit, and
the at least one of the one or more processors is one of a digital signal processor,
a graphics processing unit, or
a field-programmable gate array.

12. The computer system of claim 9, wherein the plurality of instructions are further configured to:
schedule the at least the portion of the second compute job to be executed by another coprocessor, wherein
the at least the portion of the second compute job is executed by the another coprocessor substantially simultaneously with the execution of the at least the portion of the third compute job by the at least one of the one or more coprocessors.

13. The computer system of claim 12, wherein
the computer system is coupled to another computer system comprising the another coprocessor.

14. The computer system of claim 9, wherein
the computer system is coupled to another computer system comprising the another coprocessor.

15. The computer system of claim 9, wherein
the first compute job is executed within a first container,
the second compute job is executed within a second container, and
the third compute job is executed within a third container.

16. The computer system of claim 9, wherein the computer system further comprises:
one or more local memory units, wherein
the first compute job, the second compute job, and the third compute job are ones of a plurality of compute jobs, and
each of the one or more local memory units are coupled to a corresponding one of the one or more coprocessors such that each of the one or more coprocessors executes at least a portion of a corresponding compute job of the plurality of compute jobs separately.

17. The computer system of claim 9, wherein the computer system further comprises:
a configuration memory, wherein
the first compute job, the second compute job, and the third compute job are ones of a plurality of compute jobs,
the at least one of the one or more processors is a field-programmable gate array,
the configuration memory is coupled to the field-programmable gate array,
the configuration memory is configured to store a bit stream, and
the bit stream corresponds to a compute job of the plurality of compute jobs by virtue of configuring the field-programmable gate array to execute at least a portion of the compute job.

18. A computer program product comprising:
a plurality of instructions, wherein
the plurality of instructions are configured to cause execution of a plurality of compute lobs at a first compute node that comprises
one or more processors, and
one or more coprocessors,
the one or more processors and the one or more coprocessors are separate from one another, and
the plurality of instructions comprise
a first set of instructions, executable on a computer system, configured to cause at least one of the one or more processors to execute at least a portion of a first compute job,
a second set of instructions, executable on the computer system, configured to cause at least one of the one or more coprocessors to execute at least a portion of a second compute job, wherein,
the at least the portion of the first compute job and the at least the portion of the second compute job are configured to be executed at the first compute node,
a third set of instructions, executable on the computer system, configured to, prior to the at least one of the one or more coprocessors completing execution of the at least the portion of the second compute job, cause interruption of the execution of the second compute job,
a fourth set of instructions, executable on the computer system, configured to schedule execution of at least a portion of a third compute job, wherein
the at least the portion of the third compute job is scheduled to be executed by the at least one of the one or more coprocessors,
a fifth set of instructions, executable on the computer system, configured to, in response to the interruption of the execution of the second compute job, detect a failure during the execution of the at least the portion of the second compute job, and
a fifth set of instructions, executable on the computer system, configured to restart the execution of the at least the portion of the second compute job, wherein
the execution of the at least the portion of the second compute job is restarted by causing another coprocessor to execute the at least the portion of the second compute job, and
the at least the portion of the second compute job is scheduled to be executed by the another coprocessor at a point in time at which the another coprocessor becomes available; and
a non-transitory computer-readable storage medium, wherein the instructions are encoded in the non-transitory computer-readable storage medium.

* * * * *